US010339516B2

(12) United States Patent
Ito et al.

(10) Patent No.: US 10,339,516 B2
(45) Date of Patent: Jul. 2, 2019

(54) INFORMATION PROCESSING DEVICE, INFORMATION PROCESSING SYSTEM, AND CONTROL METHOD OF AN INFORMATION PROCESSING DEVICE

(71) Applicant: Seiko Epson Corporation, Tokyo (JP)

(72) Inventors: Masahiro Ito, Matsumoto (JP); Koji Nishizawa, Shiojiri (JP); Keigo Mori, Matsumoto (JP); Yuichi Sugiyama, Matsumoto (JP); Shigeru Hirai, Aoki-mura (JP)

(73) Assignee: Seiko Epson Corporation, Tokyo (JP)

( * ) Notice: Subject to any disclaimer, the term of this patent is extended or adjusted under 35 U.S.C. 154(b) by 513 days.

(21) Appl. No.: 14/990,023

(22) Filed: Jan. 7, 2016

(65) Prior Publication Data
US 2016/0232511 A1 Aug. 11, 2016

(30) Foreign Application Priority Data

Jan. 9, 2015 (JP) .................................. 2015-003096
Dec. 21, 2015 (JP) .................................. 2015-248673

(51) Int. Cl.
*G06F 9/54* (2006.01)
*G06Q 20/20* (2012.01)
(Continued)

(52) U.S. Cl.
CPC ......... *G06Q 20/209* (2013.01); *G06Q 20/202* (2013.01); *G07G 5/00* (2013.01); *H04N 1/32101* (2013.01)

(58) Field of Classification Search
CPC ........................ G06F 9/541; H04L 29/08072
(Continued)

(56) References Cited

U.S. PATENT DOCUMENTS 7,761,406 B2 7/2010 Harken
7,814,142 B2 10/2010 Mamou et al.
(Continued)

FOREIGN PATENT DOCUMENTS

CN 102346843 A 2/2012
CN 103299327 A 9/2013
(Continued)

OTHER PUBLICATIONS

Office Action dated Dec. 12, 2017 in related U.S. Appl. No. 14/991,254 (12 pgs.).
(Continued)

*Primary Examiner* — Andy Ho
(74) *Attorney, Agent, or Firm* — Foley & Lardner LLP

(57) ABSTRACT

[Problem] To enable easily using transaction information printed on receipts through an external device.
[Solution] A control server 15 that can communicate with a printer 12 that produces receipts printed with transaction information related to a transaction, has a plurality of APIs registered thereon, and has: a control server storage unit 42 that stores a transaction information manager database 421; and a control server control unit 40 that receives transaction information from the printer 12, stores the received transaction information in the transaction information manager database 421, and when response request information requesting a response and including API call information specifying an API is received from a management device 17, executes a process through the API specified by the API call information based on the transaction information stored in the transaction information manager database 421, and sends information indicating the process result to the management device 17.

9 Claims, 19 Drawing Sheets

(51) Int. Cl.
*H04N 1/32* (2006.01)
*G07G 5/00* (2006.01)

(58) Field of Classification Search
USPC .................. 719/328; 709/203, 217, 218, 219
See application file for complete search history.

(56) References Cited

U.S. PATENT DOCUMENTS

| | | |
|---|---|---|
| 7,814,470 B2 | 10/2010 | Mamou et al. |
| 8,041,760 B2 | 10/2011 | Mamou et al. |
| 8,060,553 B2 | 11/2011 | Mamou et al. |
| 8,825,618 B2 | 9/2014 | Martin, Jr. et al. |
| 9,105,058 B2* | 8/2015 | Suzuki ............... G06Q 20/0453 |
| 9,646,291 B2* | 5/2017 | Britt ....................... G06Q 30/06 |
| 10,204,086 B1 | 2/2019 | Johnston et al. |
| 2005/0222931 A1 | 10/2005 | Mamou et al. |
| 2005/0223109 A1 | 10/2005 | Mamou et al. |
| 2005/0228808 A1 | 10/2005 | Mamou et al. |
| 2005/0232046 A1 | 10/2005 | Mamou et al. |
| 2005/0234969 A1 | 10/2005 | Mamou et al. |
| 2005/0235274 A1 | 10/2005 | Mamou et al. |
| 2005/0240354 A1 | 10/2005 | Mamou et al. |
| 2005/0240592 A1 | 10/2005 | Mamou et al. |
| 2005/0243604 A1 | 11/2005 | Harken et al. |
| 2005/0251533 A1 | 11/2005 | Harken et al. |
| 2005/0262189 A1 | 11/2005 | Mamou et al. |
| 2005/0262190 A1 | 11/2005 | Mamou et al. |
| 2005/0262193 A1 | 11/2005 | Mamou et al. |
| 2006/0010195 A1 | 1/2006 | Mamou et al. |
| 2006/0069717 A1 | 3/2006 | Mamou et al. |
| 2009/0006151 A1 | 1/2009 | Zarghami et al. |
| 2012/0084135 A1* | 4/2012 | Nissan ............... G06Q 30/0238 705/14.38 |
| 2014/0040014 A1 | 2/2014 | Anand et al. |
| 2014/0092415 A1 | 4/2014 | Yokoyama |
| 2014/0095482 A1 | 4/2014 | Argue et al. |
| 2014/0207590 A1 | 7/2014 | Bouaziz et al. |
| 2014/0207594 A1 | 7/2014 | Bouaziz et al. |
| 2014/0207595 A1 | 7/2014 | Bouaziz et al. |
| 2014/0207597 A1 | 7/2014 | Bouaziz et al. |
| 2014/0211385 A1 | 7/2014 | Bouaziz et al. |
| 2014/0236713 A1 | 8/2014 | Gotanda et al. |
| 2014/0249970 A1 | 9/2014 | Susaki et al. |
| 2016/0203453 A1 | 7/2016 | Ito et al. |

FOREIGN PATENT DOCUMENTS

| | | |
|---|---|---|
| CN | 103713863 A | 4/2014 |
| EP | 2 713 265 A2 | 4/2014 |
| JP | 2002-230402 A | 8/2002 |
| JP | 2004-240919 A | 8/2004 |
| JP | 2004-240919 A | 8/2004 |
| JP | 2008-511934 A | 4/2008 |
| JP | 2011-065340 A | 3/2011 |
| JP | 2012-032979 A | 2/2012 |
| JP | 2014-016897 A | 1/2014 |
| JP | 2014-160400 A | 9/2014 |
| JP | 2014-527205 A | 10/2014 |
| KR | 10-2008-0024711 A | 3/2008 |
| KR | 10-2008-0024711 A | 3/2008 |
| KR | 10-2014-0133620 A | 11/2014 |
| KR | 10-2014-0133620 A | 11/2014 |

OTHER PUBLICATIONS

Final Office Action dated Apr. 30, 2018 in related U.S. Appl. No. 14/991,254 (19 pgs.).

* cited by examiner

| (※1) | (※2) | (※3) | (※4) | (※5) |
|---|---|---|---|---|
| Query Parameter | Type | Required | Default | Description |
| offset | integer | No | 0 | The offset into the total list of items at which to start data retrieval |
| limit | integer | No | 10 | Maximum number of items to be retrieved. If greater than 500, an HTTP status of 400 BAD REQUEST is returned. |
| shop_id | integer | Yes | - | Filter by shop id |
| serial_no | text | No | - | Filter by printer serial number |
| date | date(YYYY-MM-DD) | No | - | Filter by date |
| order | text | No | asc | Ordering direction ('asc' or 'desc') |

※1 · · · NAME OF QUERY PARAMETER

※2 · · · DATA TYPE

※3 · · · REQUIRED IN REQUEST NAME
(YES: REQUIRED, NO: OPTIONAL)

※4 · · · DEFAULT VALUE

※5 · · · DESCRIPTION OF QUERY PARAMETER

FIG. 8

(9A)
GET {BASE_URL}/receipts?shop_id=1
(9B)
GET {BASE_URL}/receipts?shop_id=1&offset=2&limit=2
FIG. 9

| (※1) | (※2) | | (※3) |
|---|---|---|---|
| Property | Type | Not null | Description |
| href | link | Yes | Self-referencing URL |
| total | integer | Yes | Total number of items available for retrieval irrespective of limit and offset values |
| items | array (Receipt) | Yes | An array of Receipt resources |
| next.href | link | Yes | URL for retrieving the next available items in the list (generated even if there are no more items available) |
| previous.href | link | No | URL for retrieving the previous available items in the list (previous is null if there are no previous items) |
| first.href | link | Yes | URL for retrieving the first available items in the list |
| last.href | link | Yes | URL for retrieving the last available items in the list |
| offset | integer | Yes | Specified index into the total list of items at which data retrieval started |
| limit | integer | Yes | Specified maximum number of total items retrieved |

※1・・・NAME OF PROPERTY

※2・・・NULL VALUE ALLOWED
(YES: NOT ALLOWED, NO: ALLOWED)

※3・・・DESCRIPTION OF PROPERTY

FIG. 10

```
{
    "href" :     "[BASE_URL]/receipts?shop_id=1&offset=0&limit=10",
    "items" : [
        {
            "href" : "[BASE_URL]/receipts/A5B8D5CD-0683-41DE-8BE4-6D14F0971481"
            ...
        },
        {
            "href" : "[BASE_URL]/receipts/B024F661-23E8-4F3B-8744-37A99C102B8D"
            ...
        },
        {
            "href" : "[BASE_URL]/receipts/C9CF8956-08B1-4D38-A1D8-E0BA91E78586"
            ...
        },
        {
            "href" : "[BASE_URL]/receipts/D158CE2F-5B18-4D0B-8078-158D85847293"
            ...
        }
    ],
    "next" : {
        "href" : "[BASE_URL]/receipts?shop_id=1&offset=10&limit=10"
    },
    "previous" : null,
    "first" : {
        "href" : "[BASE_URL]/receipts?shop_id=1&offset=0&limit=10"
    },
    "last" : {
        "href" : "[BASE_URL]/receipts?shop_id=1&offset=0&limit=10"
    },
    "limit" : 10,
    "offset" : 0,
    "total" : 4
}
```

FIG. 11

```
{
    "href" :   "[BASE_URL]/receipts?shop_id=1&offset=2&limit=2",
    "items" : [
        {
            "href" : "[BASE_URL]/receipts/C9CF8956-08B1-4D38-A1D8-E0BA91E78586"
            ...
        },
        {
            "href" : "[BASE_URL]/receipts/D158CE2F-5B18-4D0B-8078-158D85847293"
            ...
        }
    ],
    "next" : {
        "href" : "[BASE_URL]/receipts?shop_id=1&offset=4&limit=2"
    },
    "previous" : {
        "href" : "[BASE_URL]/receipts?shop_id=1&offset=0&limit=2"
    },
    "first" : {
        "href" : "[BASE_URL]/receipts?shop_id=1&offset=0&limit=2"
    },
    "last" : {
        "href" : "[BASE_URL]/receipts?shop_id=1&offset=2&limit=2"
    },
    "limit" : 2,
    "offset" : 2,
    "total" : 4
}
```

FIG. 12

GET [BASE_URL]/receipts/A5B8D5CD-0683-41DE-8BE4-6D14F0971481

FIG. 15

| Property | Type | Not null | Description |
|---|---|---|---|
| href | link | Yes | Self-referencing URL |
| guid | text | Yes | Unique id identifying this receipt |
| serial_no | text | Yes | Serial number of printer that issued this receipt |
| shop_id | integer | Yes | Id of shop that issued this receipt |
| printed_at | datetime (ISO8601) | Yes | Date and time at which this receipt was printed/the transaction occurred |
| receipt_id | text | Yes | The receipt identifier issued by the shop POS system (does not identify a receipt globally) |
| is_refund | boolean | Yes | True if the receipt is a refund |
| total | float | Yes | Total value of transaction after taxes are applied |
| subtotal | float | No | Total value of transaction before taxes are applied |
| guests | integer | No | Number of guests |
| sale_type | text | No | A sale type descriptor indicating one of eat in, eat out, drive thru, catering, or delivery ('IN', 'OUT', 'THRU', 'CATERING', 'DELIVERY', respectively) |
| consumer_id | text | No | An opaque consumer identifier (may be null if consumer identification was not possible) |
| staff | object | No | Identifying information of the staff member who handled the transaction (null if staff identification was not possible) |
| staff.id | text | Yes | An opaque staff identifier |
| staff.has_original_id | boolean | Yes | When false, indicates that the staff id was generated and is not a value directly obtained from the printed data |
| memberships | array | Yes | List of consumer's memberships/rewards programs |
| memberships[].name | text | Yes | Name of consumer's membership/rewards program |
| memberships[].account_no | text | Yes | Account number of consumer's membership/rewards program |
| is_void | boolean | Yes | True, if this receipt has been made void |
| void | object | No | If not null, contains information relating to a void operation that occurred as a result of this receipt |
| void.target | Receipt | Yes | The target of the void operation i.e. the receipt that was made void as a result of this receipt |
| void.target.href | link | Yes | A link to the target of the void operation |
| void.type | text | Yes | Indicates the type of void operation, can be the result of a plain void, split, or update operation ('VOID', 'SPLIT', 'UPDATE', respectively) |
| taxes | array | Yes | List of tax entries |
| taxes[].name | text | No | Name of tax (null if not available) |
| taxes[].value | float | Yes | Tax amount |
| products | array (Product) | Yes | A list of purchased products; see Product |
| discounts | array | Yes | List of receipt global discounts |
| discounts[].name | text | Yes | Discount name/description |
| discounts[].value | float | Yes | Discount value |
| payment_methods | array | Yes | Breakdown of sales total by payment method |
| payment_methods[].name | text | Yes | Name or description of the payment method |
| payment_methods[].value | float | Yes | Amount paid out of the total using the payment method |

FIG. 16

| Property | Type | Not null | Description |
|---|---|---|---|
| name | text | Yes | Product name |
| quantity | float | Yes | Quantity of product purchased. Negative in the case of a product correction. May be fractional (products sold by weight etc.). |
| price | float | Yes | Product price of full quantity before any discounts |
| discounts | array | Yes | A list of discounts applied to the product |
| discounts[].name | text | Yes | Name of the product discount |
| discounts[].value | float | Yes | Value of the product discount |
| modifiers | array | Yes | List of product modifiers |
| modifiers[].name | text | Yes | Modifiers name |
| modifiers[].quantity | float | No | Quantity of modifier purchased. Negative in the case of modifier correction. May be fractional (modifiers sold by weight etc.). |
| modifiers[].price | float | No | Modifier price of full quantity before any discounts |
| modifiers[].discounts | array | Yes | A list discounts applied to the modifier |
| modifiers[].discounts[].name | text | Yes | Name of the modifier discount |
| modifiers[].discounts[].value | float | Yes | Value of the modifier discount |

INFORMATION PROCESSING DEVICE, INFORMATION PROCESSING SYSTEM, AND CONTROL METHOD OF AN INFORMATION PROCESSING DEVICE

TECHNICAL FIELD

The present invention relates to an information processing device, an information processing system, and a control method of an information processing device.

BACKGROUND

Control devices (sales management servers) that receive transaction information (sales information) from devices in stores, store the received transaction information, and execute processes based on the stored transaction information are known from the literature. (See, for example, PTL 1).

CITATION LIST

Patent Literature

PTL 1: JP-A-2014-160400

SUMMARY OF INVENTION

Technical Problem

Printers that can produce receipts printed with transaction information based on a sales transaction are widely used today. Because the transaction information that is printed on receipts contains information related to the products the customer purchased, information related to customer payments, and other information that is useful for store operations and store management, there is a desire to be able to easily make use of the transaction information through an external device.

The present invention is directed to the foregoing, and an objective of the invention is to enable easily utilizing transaction information that is printed on receipts through an external device.

Solution to Problem

To achieve the foregoing objective, the present invention is an information processing device capable of communicating with a printer that produces receipts printed with transaction information related to a transaction, and has a plurality of APIs registered thereon, including: a storage unit storing a database; and a control unit that receives the transaction information from the printer and stores the received transaction information in the database, and when response request information requesting a response and including API call information specifying the API is received from an external device, executes a process through the API specified by the API call information based on the transaction information stored in the database, and sends information indicating the process result to the external device.

In this aspect of the invention, an API having a function for executing a process based on a database is registered in the information processing device. Using the API, the external device can cause the information processing device to execute a process based on the database and can acquire the process result. Transaction information printed on a receipt can therefore be easily used through the external device.

The invention is further characterized by the printer being installed in a store; the transaction information stored in the database including batch identification information identifying the transaction corresponding to the transaction information; a specific API among the APIs functioning to acquire, based on the transaction information stored in the database, the batch identification information related to the receipts produced by the printer installed in the store identified by specific store identification information amongst store identification information identifying the stores; and when response request information including the API call information specifying the specific API and the store identification information is received from the external device, the control unit executing a process through the specific API, and acquiring and transmitting the batch identification information related to receipts produced by the printer installed in the store of the store identification information contained in the response request information as the information indicating the process result.

In this aspect of the invention, batch identification information related to a receipt issued by a specific store can be easily acquired through the external device using a specific API.

The invention is further characterized by the transaction information including printer identification information identifying the printer, and batch identification information identifying the transaction corresponding to the transaction information; a specific API among the APIs functioning to acquire the batch identification information of the receipts produced by the printer of the specific printer identification information; and when response request information including the API call information specifying the specific API and the printer identification information is received from the external device, the control unit executing a process through the specific API, and acquiring and transmitting the batch identification information related to receipts produced by the printer of the printer identification information contained in the response request information as the information indicating the process result.

In this aspect of the invention, batch identification information related to a receipt produced by a specific printer can be easily acquired through the external device using a specific API.

The invention is further characterized by the transaction information including batch identification information identifying the transaction corresponding to the transaction information, and purchased product information related to a product purchased in the transaction; a specific API among the APIs functioning to acquire the purchased product information contained in the transaction information related to the specific batch identification information; and when response request information including the API call information specifying the specific API and the batch identification information is received from the external device, the control unit executing a process through the specific API, and acquiring and transmitting the purchased product information contained in the transaction information related to the batch identification information contained in the response request information as the information indicating the process result.

In this aspect of the invention, purchased product information can be easily acquired through the external device using a specific API.

The invention is further characterized by the transaction information including batch identification information identifying the transaction corresponding to the transaction information, and amount information related to payment in the transaction; a specific API among the APIs functioning to acquire the amount information contained in the transaction information related to the specific batch identification information; and when response request information including the API call information specifying the specific API and the batch identification information is received from the external device, the control unit executing a process through the specific API, and acquiring and transmitting the amount information contained in the transaction information related to the batch identification information contained in the response request information as the information indicating the process result.

In this aspect of the invention, amount information can be easily acquired through the external device using a specific API.

The invention is further characterized by the transaction information including batch identification information identifying the transaction corresponding to the transaction information, and discount information related to a discount in the transaction; a specific API among the APIs functioning to acquire the discount information contained in the transaction information related to the specific batch identification information; and when response request information including the API call information specifying the specific API and the batch identification information is received from the external device, the control unit executing a process through the specific API, and acquiring and transmitting the discount information contained in the transaction information related to the batch identification information contained in the response request information as the information indicating the process result.

In this aspect of the invention, discount information can be easily acquired through the external device using a specific API.

The invention is further characterized by the transaction information including batch identification information identifying the transaction corresponding to the transaction information, and tax information related to taxes in the transaction; a specific API among the APIs functioning to acquire the tax information contained in the transaction information related to the specific batch identification information; and when response request information including the API call information specifying the specific API and the batch identification information is received from the external device, the control unit executing a process through the specific API, and acquiring and transmitting the tax information contained in the transaction information related to the batch identification information contained in the response request information as the information indicating the process result.

In this aspect of the invention, tax information can be easily acquired through the external device using a specific API.

To achieve the foregoing objective, the invention is further characterized by an information processing system including an information processing device having a plurality of APIs registered thereon and capable of communicating with a printer that produces receipts printed with transaction information related to a transaction, and an external device capable of communicating with the information processing device; the external device transmitting response request information requesting a response and including API call information specifying the API to the information processing device; and the information processing device receiving the transaction information from the printer and storing the received transaction information in a database, and having a control unit that, when the response request information is received from the external device, executes a process through the API specified by the API call information based on the transaction information stored in the database, and sends information indicating the process result to the external device.

In this aspect of the invention, an API having a function for executing a process based on a database is registered in an information processing device of an information processing system. Using the API, the external device can cause the information processing device to execute a process based on the database and can acquire the process result. Transaction information printed on a receipt can therefore be easily used through the external device.

To achieve the foregoing objective, the invention is further characterized by a control method of an information processing device capable of communicating with a printer that produces receipts printed with transaction information related to a transaction, and having a plurality of APIs registered thereon, including: receiving the transaction information from the printer and storing the received transaction information in a database; and when response request information requesting a response and including API call information specifying an API is received from an external device, executing a process through the API specified by the API call information based on the transaction information stored in the database, and sending information indicating the process result to the external device.

In this aspect of the invention, an API having a function for executing a process based on a database is registered in the information processing device. Using the API, the external device can cause the information processing device to execute a process based on the database and can acquire the process result. Transaction information printed on a receipt can therefore be easily used through the external device.

BRIEF DESCRIPTION OF DRAWINGS

FIG. 8 shows query parameters related to the Receipts Web API.

FIG. 9 shows an example of a request line related to the Receipts Web API.

FIG. 10 shows properties of the Receipts Web API.

FIG. 11 shows an example of response data.

FIG. 12 shows an example of response data.

FIG. 15 shows an example of a request line related to the Receipts Web API.

FIG. 16 shows properties of the Receipts Web API.

FIG. 17 shows properties associated with the property "puroducts".

FIG. 18 shows an example of response data.

DESCRIPTION OF EMBODIMENTS

A preferred embodiment of the present invention is described below with reference to the accompanying figures.

Figure 1:
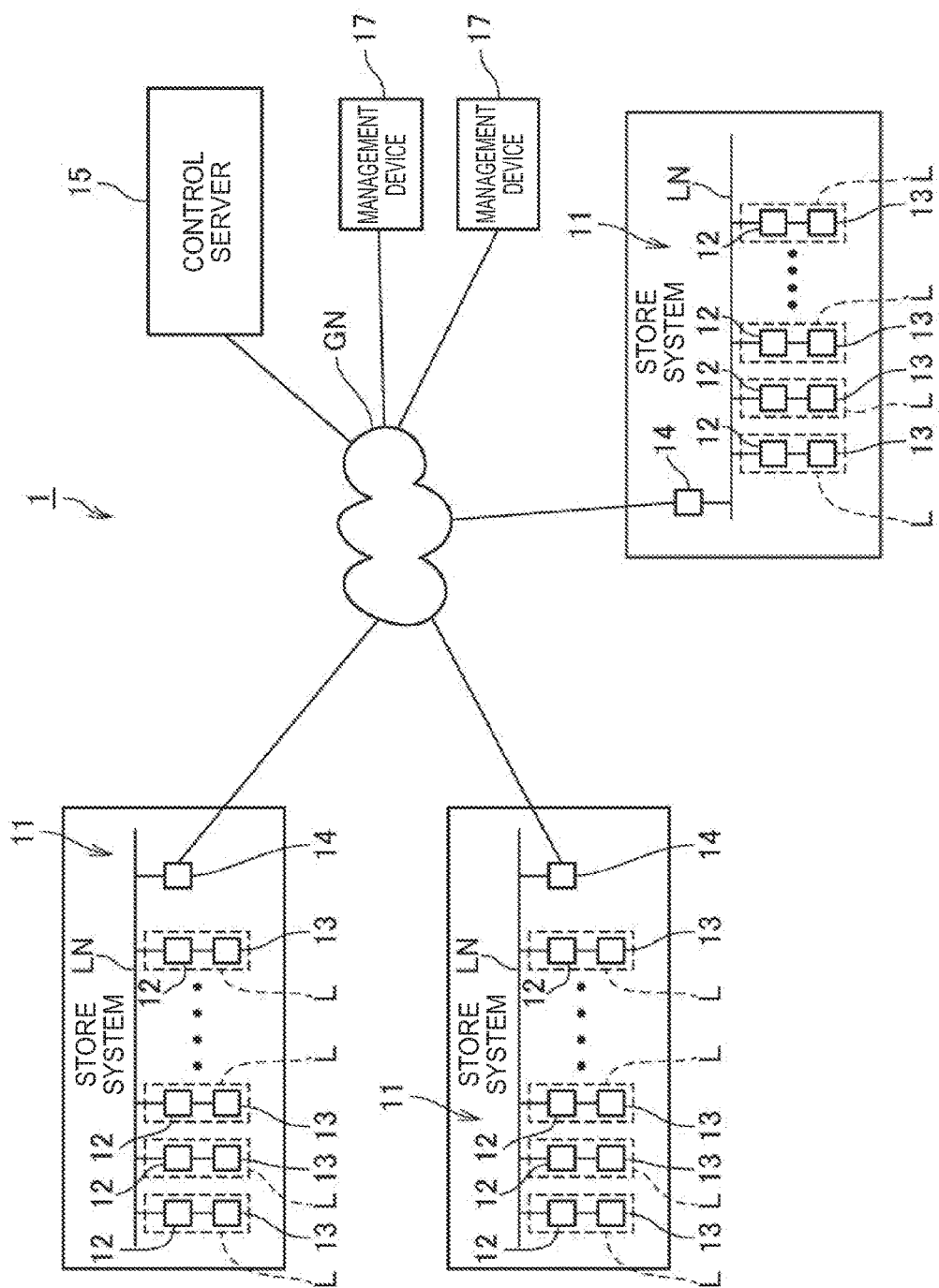
FIG. 1 illustrates the configuration of a transaction processing system according to a preferred embodiment of the invention.

FIG. 1 shows the configuration of a transaction processing system 1 (information processing system) according to this embodiment of the invention.

As shown in FIG. 1, the transaction processing system 1 includes a plurality of store systems 11. A store system 11 is a system that is used in retail businesses such as supermarkets, convenience stores, department stores, and restaurants. The business may be any facility in which a product is provided and a customer transaction is performed according to provision of the product. In this embodiment, the product is not limited to a physical product supplied to the customer, and means any object that is provided to a customer in exchange for payment, including a service provided to a customer or food or drink provided to a customer.

The store system 11 has functions for processing transactions according to the products purchased by customers, and producing receipts based on the transactions.

A checkout counter L where customer transactions are processed is located in the business where the store system 11 is deployed. A printer 12 capable of recording on roll paper (recording media) is installed at the checkout counter L. A tablet terminal 13 that connects and communicates wirelessly with the printer 12 and controls the printer 12 is also disposed at the checkout counter L.

During a transaction at the checkout counter L, the cash register operator reads barcodes from the products or product packaging using a barcode reader BR connected to the printer 12, and inputs information related to the transaction to the tablet terminal 13. The printer 12 sends data based on reading with the barcode reader BR to the tablet terminal 13. Based on the data acquired by reading with the barcode reader BR and received from the printer 12, and transaction-related input from the operator, the tablet terminal 13 causes the printer 12 to produce a receipt. The receipt produced by the printer 12 is then given by the operator to the customer.

The configuration, functions, and processes based on the functions of the printer 12 and tablet terminal 13 are described further below.

A local area network LN is deployed in the store system 11.

The printer 12 connects to the local area network LN using a communication protocol used on the LAN.

A communication device 14 is also connected to the local area network LN. The communication device 14 is an interface device that connects to the local area network LN and a global network GN including the Internet, telephone network, and other communication networks. The communication device 14 has the functions of a modem (or ONU (Optical Network Unit)), a router, a NAT (Network Address Translation) unit, and a DHCP (Dynamic Host Configuration Protocol) server. The communication device 14 transfers data that is sent and received between devices when a device connected to the local area network LN and a device connected to the global network GN communicate with each other. Note that the communication device 14 is represented by a single block in FIG. 1, but the communication device 14 may comprise plural devices with different functions.

The printer 12 can also access the global network GN through the communication device 14.

A control server 15 (information processing device) is connected to the global network GN. The control server 15 is a cloud server in a cloud system in which the printer 12 and a management device 17 (external device) described below are clients. More specifically, when triggered by a request from a client, for example, the control server 15 runs a specific computing process. The control server 15 sends data based on the result of the computing process to the client as needed. Note that the control server 15 is represented by a single block in FIG. 1, but this does not mean that the control server 15 is embodied by a single server device. For example, the control server 15 may comprise a plurality of server devices. More specifically, the control server 15 may be configured in any way enabling executing the processes described below.

A management device 17 (external device) is also connected to the global network GN.

The management device 17 is a terminal located, for example, in the headquarters of the company that manages the store where the store system 11 is deployed. A person with authority, such as the manager of the store, can use the management device 17 to receive specific services provided by the control server 15. Services provided by the control server 15 are described below.

Figure 2:
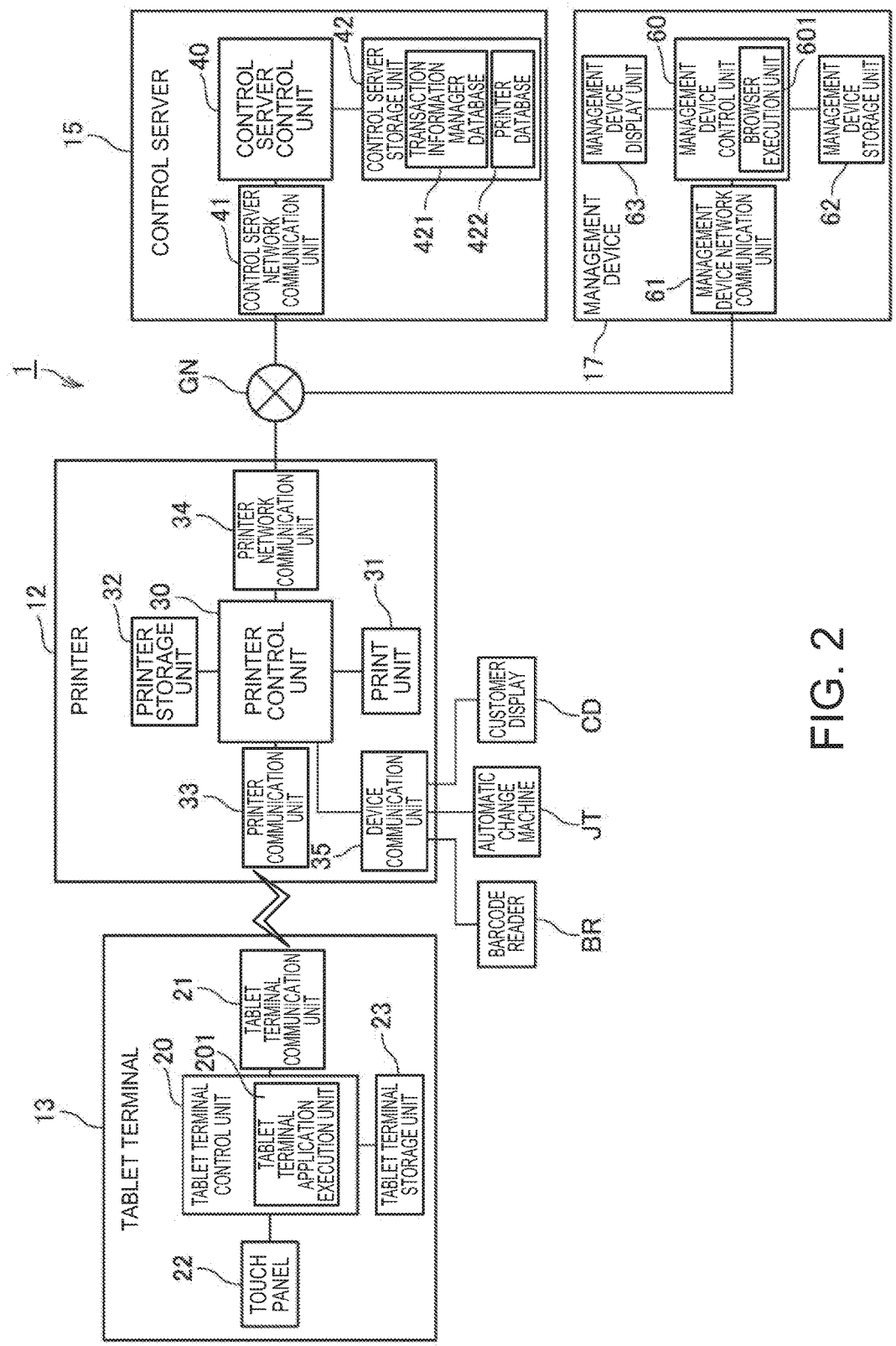
FIG. 2 is a block diagram illustrating the functional configuration of devices in the transaction processing system.

FIG. 2 is a block diagram illustrating the functional configuration of devices in the transaction processing system 1.

The tablet terminal 13 is a tablet (flat panel) computer with a touch panel 22 covering a large area on the front. When a transaction is processed at the checkout counter L, the tablet terminal 13 functions as a host computer that runs transaction-related processes and controls the printer 12.

As shown in FIG. 2, the tablet terminal 13 includes a tablet terminal control unit 20, a tablet terminal communication unit 21, a touch panel 22, and a tablet terminal storage unit 23.

The tablet terminal control unit 20 includes a CPU, ROM, RAM, and other peripheral circuits, and controls the tablet terminal 13. A specific application ("tablet terminal application TAP" below) is preinstalled on the tablet terminal 13. The tablet terminal control unit 20 functions as a tablet terminal application execution unit 201 by reading and running the tablet terminal application TAP and associated programs.

The tablet terminal communication unit 21 communicates with the printer 12 according to a specific communication protocol as controlled by the tablet terminal control unit 20. The wireless communication standard for wireless communication between the tablet terminal 13 and printer 12 may be a wireless LAN standard compatible with an ad hoc mode, a wireless LAN standard compatible with an infrastructure mode, or a near-field communication standard such as Bluetooth®, for example.

The touch panel 22 combines an LCD panel or other type of display panel, and a touch sensor overlaid to the display panel. The display panel displays images as controlled by the tablet terminal control unit 20. The touch sensor detects touch operations and outputs to the tablet terminal control unit 20. The tablet terminal control unit 20 then executes processes appropriate to the touch operation based on input from the touch sensor.

The tablet terminal storage unit 23 has nonvolatile memory, and stores data.

The printer 12 is a thermal line printer that holds roll paper and forms dots on the stored roll paper with a line thermal head to print images.

As shown in FIG. 2, the printer 12 has a printer control unit 30, print unit 31, printer storage unit 32, printer communication unit 33, printer network communication unit 34, and device communication unit 35.

The printer control unit 30 includes a CPU, ROM, RAM, and other peripheral circuits, and controls the printer 12.

The print unit 31 includes mechanisms related to printing on roll paper, such as a conveyance mechanism for conveying roll paper stored inside the cabinet of the printer 12, a printing mechanism for forming dots and printing images on the roll paper with a thermal head, and a cutter mechanism for cutting the roll paper at a specific position. As controlled by the printer control unit 30, the print unit 31 conveys the roll paper with the conveyance mechanism, prints receipt-related images on the roll paper by the printing mechanism while, and then cuts the roll paper at a specific position with the cutter mechanism, producing a receipt.

The printer storage unit 32 has nonvolatile memory and stores data.

The printer communication unit 33 communicates with the tablet terminal 13 according to a specific communication protocol as controlled by the printer control unit 30.

The printer network communication unit 34 communicates with devices connected to the global network GN (including the control server 15) according to a specific communication protocol as controlled by the printer control unit 30.

The device communication unit 35 includes an interface board with ports such as a USB port, a serial communication port other than a USB port, or other type of port. A device can connect to each port. The device communication unit 35 communicates with the devices connected to the printer 12 through the ports as controlled by the printer control unit 30.

Note that the device communication unit 35 may be configured with a wireless communication capability for communicating wirelessly with devices.

A barcode reader BR, customer display CD, and an automatic change machine JT are examples of devices connected to the tablet terminal 13 in this example.

The barcode reader BR is used to read barcodes from products and product packaging, and outputs the read result to the device communication unit 35. The device communication unit 35 outputs the data input from the barcode reader BR to the printer control unit 30.

The customer display CD displays transaction-related information as controlled by the printer control unit 30. The information presented on the customer display CD can be checked by the customer involved in the transaction at the checkout counter L.

The automatic change machine JT has cash receiver openings for receiving cash inserted by the customer and cash dispenser openings for dispensing change according to the amount received, and when cash is input through the cash receiver, the change due is dispensed from the cash return openings as controlled by the printer control unit 30.

The control server 15 is a cloud server to which the printer 12 and management device 17 connect as clients.

As shown in FIG. 2, the control server 15 includes a control server control unit 40 (control unit), control server network communication unit 41, and control server storage unit 42 (storage unit).

The control server control unit 40 includes a CPU, ROM, RAM, and other peripheral circuits, and controls the control server 15.

The control server network communication unit 41 communicates with devices connected to the global network GN (including printers 12 and management devices 17) according to a specific communication protocol as controlled by the control server control unit 40.

The control server storage unit 42 stores data (including a transaction information manager database 421 (database), and a printer database 422).

The management device 17 is a device that is managed by the entity that manages the store in which the store system 11 is deployed.

As shown in FIG. 2, the management device 17 includes a management device control unit 60, management device network communication unit 61, management device storage unit 62, and management device display unit 63.

The management device control unit 60 includes a CPU, ROM, RAM, and controls the management device 17. A browser is installed on the management device 17. The management device control unit 60 functions as a browser execution unit 601 by reading and running the browser and associated programs.

The management device network communication unit 61 communicates with devices connected to the global network GN (including the control server 15) according to a specific communication protocol as controlled by the management device control unit 60.

The management device storage unit 62 stores data.

The management device display unit 63 includes an LCD panel or other display panel, and displays information as controlled by the management device control unit 60.

Operation of the tablet terminal 13, printer 12, and control server 15 when a customer transaction is processed at the checkout counter L is described next.

Figure 3:
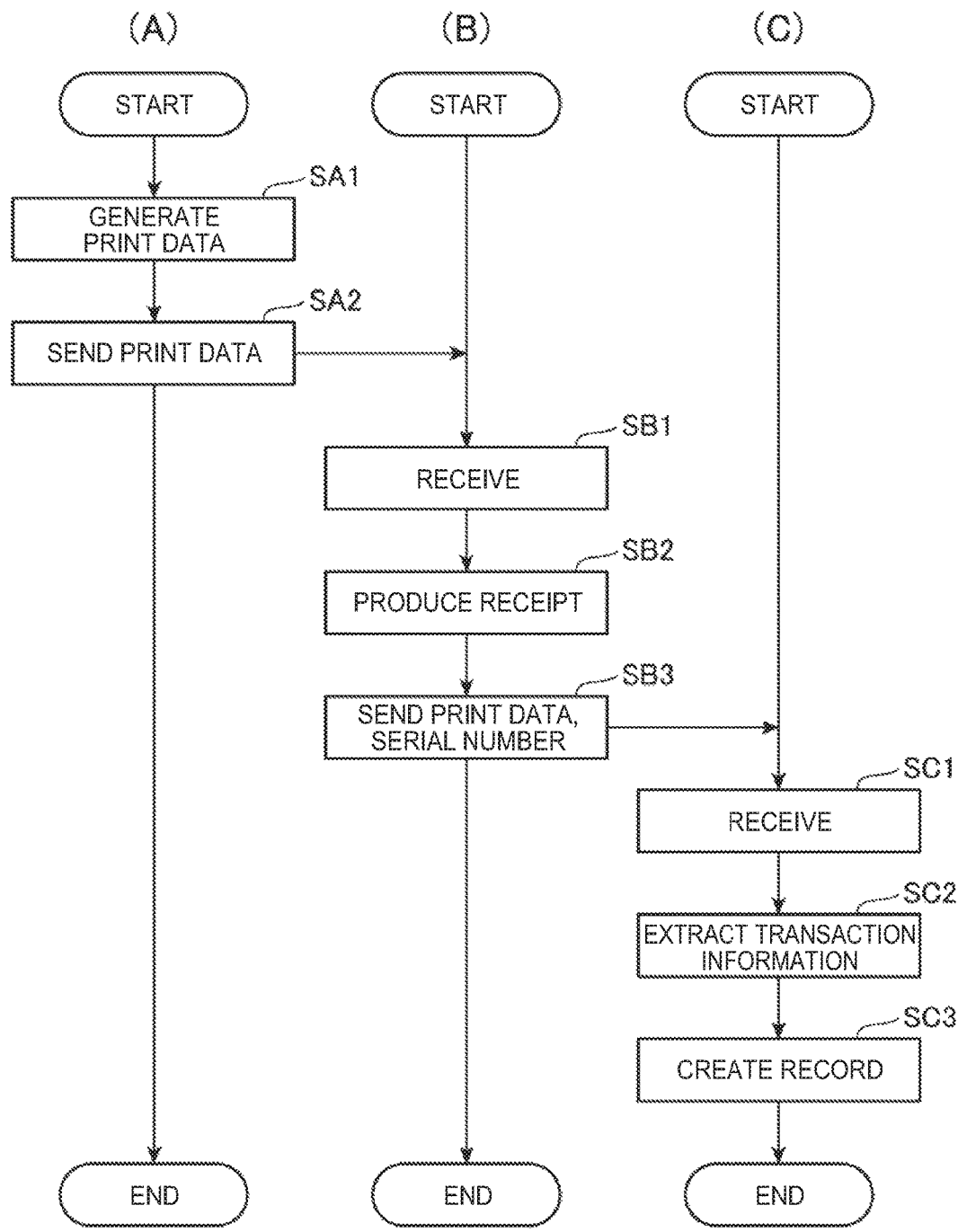
FIG. 3 is a flow chart illustrating the operation of a tablet terminal, printer, and control server in the transaction processing system.

FIG. 3 is a flow chart of the operation of the tablet terminal 13, printer 12, and control server 15 when processing a transaction at the checkout counter L. FIG. 3(A) shows the operation of the tablet terminal 13, (B) shows the operation of the printer 12, and (C) shows the operation of the control server 15.

As shown in FIG. 3(A), the tablet terminal application execution unit 201 of the tablet terminal control unit 20 of the tablet terminal 13 executes a transaction process (payment process) according to the customer transaction, and generates print data based on the transaction process (step SA1). The print data is control data instructing producing a receipt.

More specifically, in step SA1, the tablet terminal application execution unit 201 generates receipt information based on input from the printer 12 and input from the checkout clerk on the touch panel 22 according to the customer transaction. The receipt information is information the printer 12 prints on the produced receipt. The receipt information is described more specifically below.

Next, the tablet terminal application execution unit 201 generates print data based on the generated receipt information. The print data is control data instructing producing a receipt with the receipt information printed according to a specific layout. The print data includes plural control commands in the command language of the printer 12.

After generating the print data in step SA1, the tablet terminal application execution unit 201 controls the tablet terminal communication unit 21 to send the generated print data to the printer 12 (step SA2).

As shown in FIG. 3(B), the printer control unit 30 of the printer 12 controls the printer communication unit 33 to receive the print data (step SB1).

Next, the printer control unit 30 controls the print unit 31 to produce a receipt based on the print data received in step SB1 (step SB2). The resulting receipt is given to the customer.

Figure 4:
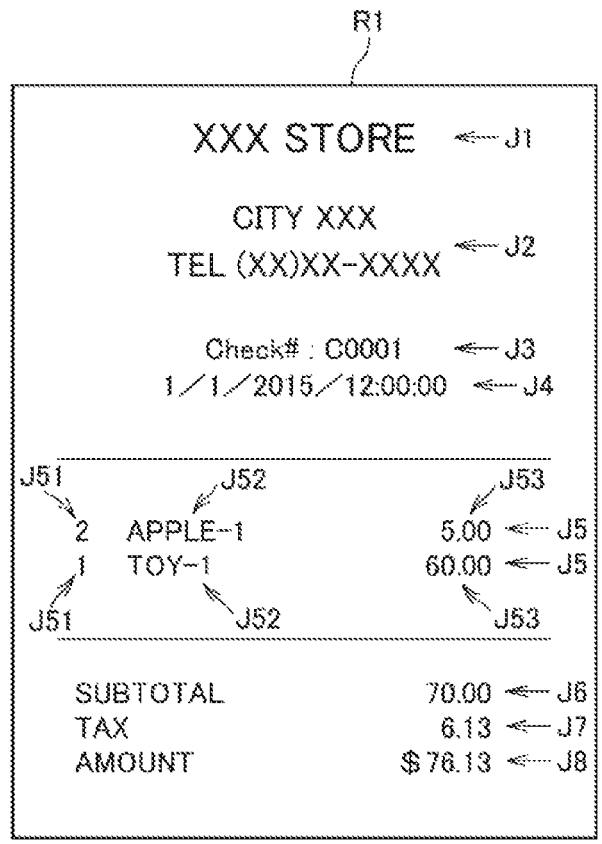
FIG. 4 shows an example of a receipt.

FIG. 4 shows receipt R1 as an example of a receipt produced by a printer 12 based on the print data.

Logo information J1 as a graphical representation of the name of the store is recorded on the receipt R1 in FIG. 4.

Store information J2 indicating the address and telephone number of the store is also recorded on the receipt R1.

Receipt identification information J3 identifying the receipt is also recorded on the receipt R1.

Receipt date information J4 indicating when the receipt was produced is also recorded on the receipt R1.

One or more lines of line item information J5 containing information related to the products purchased by the customer is also recorded on the receipt R1. The line item information J5 includes for each product purchased by the customer: purchase quantity information J51 indicating the purchased quantity of the product, product name information J52 indicating the name of the product, and unit price information J53 indicating the price of the product.

Subtotal information J6 indicating the subtotal is also recorded on the receipt R1.

Tax-related information J7 indicating the applicable taxes is also recorded on the receipt R1.

Transaction total information J8 identifying the total amount of the transaction is also recorded on the receipt R1.

The printer control unit 30 prints the information from the logo information J1 to the transaction total information J8 based on the print data.

Next, the printer control unit 30 controls the printer network communication unit 34 to send the serial number J9 and the print data received in step SB1 to the control server 15 (step SB3).

The serial number J9 is identification information uniquely assigned to the printer 12 when the printer 12 is manufactured. The serial number J9 is equivalent to printer identification information.

Note that in step SB3, the serial number J9 and information related to communication required to transmit the print data (information related to the destination, the protocol used for communication, and the format of the transmitted data, for example) is previously registered in the printer 12.

As shown in FIG. 3(C), the control server control unit 40 of the control server 15 controls the control server network communication unit 41 to receive the serial number J9 and the print data transmitted by the printer 12 (step SC1).

Next, the control server control unit 40 extracts the transaction information from the received print data (step SC2).

The transaction information is a predefined subset of the receipt information printed on the receipt. More specifically, in the sample receipt R1 shown in FIG. 4, the transaction information includes the receipt identification information J3, receipt date information J4, line item information J5 (quantity information J51, product name information J52, unit price information J53), subtotal information J6, tax information J7, and transaction total information J8.

Next, the control server control unit 40 accesses the transaction information manager database 421 (database) stored on the control server storage unit 42, and creates a record in the transaction information manager database 421 based on the serial number J9 received in step SC1 and the transaction information extracted in step SC2 (step SC3).

Figure 5:
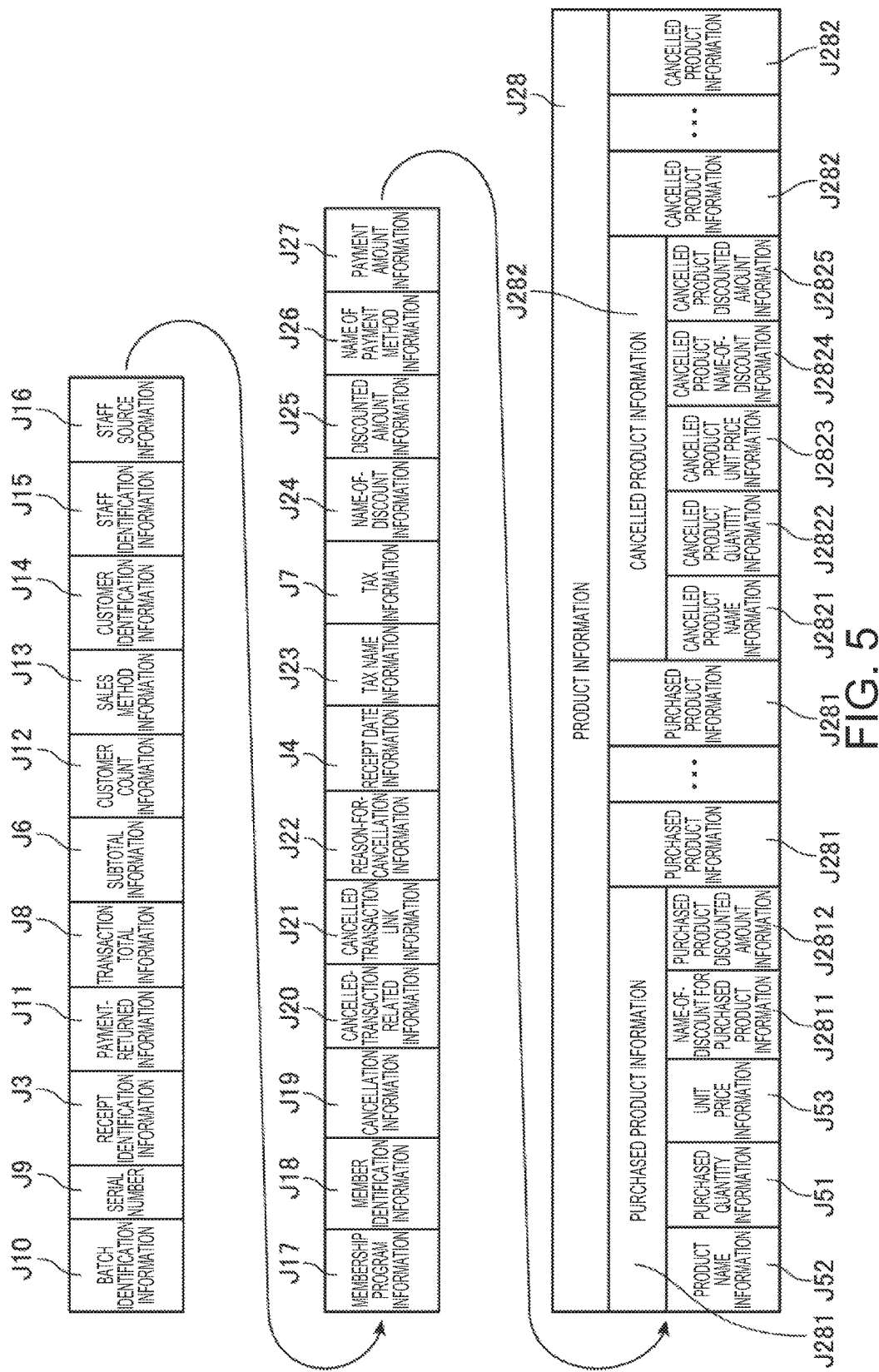
FIG. 5 illustrates a transaction information management database.

FIG. 5 schematically illustrates the information contained in a record of the transaction information manager database 421.

As shown in FIG. 5, each record in the transaction information manager database 421 stores batch identification information J10. The batch identification information J10 is the identification information identifying the corresponding receipt (=identification information identifying the transaction corresponding to the transaction information). The control server control unit 40 generates and includes in each record batch identification information J10 of a unique value according to a specific rule.

As shown in FIG. 5, each record in the transaction information manager database 421 also stores a serial number J9.

In step SC3, the control server control unit 40 stores the serial number J9 received in step SC1 in the record.

As shown in FIG. 5, each record in the transaction information manager database 421 also stores receipt identification information J3.

If the receipt identification information J3 extracted in step SC2 is contained in the transaction information, the control server control unit 40 acquires and includes the receipt identification information J3 contained in the transaction information in the record in step SC3. If not contained, the control server control unit 40 acquires receipt identification information J3 by a specific means and includes it in the record.

As shown in FIG. 5, each record in the transaction information manager database 421 also contains payment-returned information J11.

The payment-returned information J11 is information indicating whether or not a payment was returned in the transaction related to the print data received in step SC1.

In step SC3, the control server control unit 40 sets the payment-returned information J11 to the default value of "payment not returned". If payment was returned for the corresponding transaction, the payment-returned information J11 is changed to "payment returned" by a person with proper authority.

As shown in FIG. 5, each record in the transaction information manager database 421 contains transaction total information J8.

When the transaction total information J8 is contained in the transaction information extracted in step SC2, in step SC3 the control server control unit 40 stores the information in the record. If not contained, the control server control unit 40 writes a null value to the transaction total information J8 field in the record.

As shown in FIG. 5, each record in the transaction information manager database 421 also contains subtotal information J6.

When the subtotal information J6 is contained in the transaction information extracted in step SC2, in step SC3 the control server control unit 40 acquires and stores the subtotal information J6 contained in the transaction information in the record. If not contained, the control server control unit 40 writes a null value to the subtotal information J6 field in the record.

As shown in FIG. 5, each record in the transaction information manager database 421 also contains customer count information J12.

The customer count information J12 is information indicating the number of customers involved with the transaction. For example, if the store is a food service business, plural customers may be involved in a single transaction. The customer count information J12 may also be printed on the receipt. In this event, the customer count information J12 is included in the transaction information.

If the customer count information J12 is included in the transaction information extracted in step SC2, the control server control unit 40 in step SC3 acquires and stores the customer count information J12 contained in the transaction information in the record. If not contained, the control server control unit 40 writes a null value to the customer count information J12 field in the record.

As shown in FIG. 5, each record in the transaction information manager database 421 contains sales method information J13. The sales method information J13 is information identifying the method whereby the product or service was sold (provided). Examples of the sales method include in-store sale, non-store sale, drive-through sale, catering sale, and home-delivery sale. The sales method information J13 may be printed on the receipt. In this event, the sales method information J13 is included in the transaction information.

If the sales method information J13 is included in the transaction extracted in step SC2, the control server control unit 40 in step SC3 acquires and stores the sales method information J13 contained in the transaction information in the record. If not contained, the control server control unit 40 writes a null value to the sales method information J13 field in the record.

As shown in FIG. 5, each record in the transaction information manager database 421 also contains customer identification information J14.

The customer identification information J14 is information identifying the customer that completed the transaction. A card storing the customer identification information J14 may be read in the transaction, and the customer identification information J14 may be printed on the receipt. In this event, the customer identification information J14 is included in the transaction information.

If the customer identification information J14 is included in the transaction information extracted in step SC2, in step SC3 the control server control unit 40 acquires and stores the customer identification information J14 contained in the transaction information in the record. If not contained, the control server control unit 40 writes a null value to the customer identification information J14 field in the record As shown in FIG. 5, each record in the transaction information manager database 421 also contains staff identification information J15.

The staff identification information J15 is identification information identifying the employee that handled the transaction. In this event, the staff identification information J15 is included in the transaction information.

If the staff identification information J15 is included in the transaction information extracted in step SC2, in step SC3 the control server control unit 40 acquires and stores the staff identification information J15 contained in the transaction information in the record. If not contained, the control server control unit 40 writes a null value to the staff identification information J15 field in the record.

As shown in FIG. 5, each record in the transaction information manager database 421 also contains staff source information J16.

When the staff identification information J15 described above is not the null value, the staff source information J16 is information indicating whether or not the staff identification information J15 is information extracted from the print data (=information printed on the receipt).

If the staff identification information J15 is contained in the transaction information and the staff identification information J15 is not the null value, in step SC3 the control server control unit 40 records the staff source information J16 in the record as a value denoting that the staff identification information J15 is information extracted from the print data. If the staff identification information J15 is not contained in the transaction information and the staff identification information J15 is the null value, in step SC3 the control server control unit 40 records the staff source information J16 in the record as a value denoting that the staff identification information J15 is not information extracted from the print data.

As shown in FIG. 5, each record in the transaction information manager database 421 contains membership program information J17.

The membership program information J17 is information identifying the name of the award program to which the customer belongs. The customer may belong to a specific award program (such as an award program that awards points) provided by a specific organization. When the award program associated with the customer is acquired during the transaction, membership program information J17 indicating the name of the award program may be printed on the receipt.

If the membership program information J17 is contained in the transaction information, in step SC3 the control server control unit 40 acquires and stores the membership program information J17 contained in the transaction information in the record. If not contained, the control server control unit 40 writes a null value to the membership program information J17 field in the record.

As shown in FIG. 5, each record in the transaction information manager database 421 also contains member identification information J18.

The member identification information J18 is information identifying the membership number of the customer in the award program associated with the customer.

When the customer is associated with a specific award program, the member identification information J18 may be printed on the receipt.

If the member identification information J18 is included in the transaction information, in step SC3 the control server control unit 40 acquires and stores the member identification information J18 contained in the transaction information in the record. If not contained, the control server control unit 40 writes a null value as the member identification information J18 in the record.

As shown in FIG. 5, each record in the transaction information manager database 421 also contains cancellation information J19.

The cancellation information J19 is information indicating whether or not the transaction related to the print data based on which the record was generated was cancelled. A transaction completed in a store may have been cancelled by the customer returning the product, for example.

In step SC3, the control server control unit 40 sets the cancellation information J19 to "not cancelled," which is the default value. If the corresponding transaction was cancelled, the cancellation information J19 is changed by an authorized person using a specific method to a value indicating the transaction was cancelled.

As shown in FIG. 5, each record in the transaction information manager database 421 contains cancelled-transaction related information J20.

The cancelled-transaction related information J20 is information related to the transaction that was cancelled when the transaction related to the print data from which the record was created is a transaction performed to cancel another transaction.

In step SC3, the control server control unit 40 includes cancelled-transaction related information J20 of the default null value in the record. The cancelled-transaction related information J20 may be changed by an authorized person using a specific method under specific circumstances.

As shown in FIG. 5, each record in the transaction information manager database 421 contains cancelled transaction link information J21.

The cancelled transaction link information J21 is information identifying an address link when the transaction related to the print data from which the record was generated is a transaction related to cancellation of another transaction, and there is a link to the information related to the other transaction that was cancelled.

In step SC3, the control server control unit 40 includes cancelled transaction link information J21 of the null value, which is the default value, in the record. The cancelled transaction link information J21 may be changed by an authorized person using a specific method.

As shown in FIG. 5, each record in the transaction information manager database 421 contains reason-for-cancellation information J22.

When the transaction related to the print data from which the record was created was performed in response to cancellation of another transaction, the reason-for-cancellation information J22 is information indicating the reason why the cancelled transaction was cancelled.

In step SC3, the control server control unit 40 includes reason-for-cancellation information J22 of the null value, which is the default value, in the record. The reason-for-cancellation information J22 may be changed by an authorized person using a specific method.

As shown in FIG. 5, each record in the transaction information manager database 421 contains receipt date information J4. If receipt date information J4 is included in the transaction information extracted in step SC2, in step SC3 the control server control unit 40 acquires and includes in the record the receipt date information J4 contained in the transaction information. If not contained, the control server control unit 40 writes a null value to the receipt date information J4 field in the record.

As shown in FIG. 5, each record in the transaction information manager database 421 contains tax name information J23.

The tax name information J23 is information identifying the name of the tax when tax, such as sales tax, is applied to the transaction.

If tax name information J23 extracted in step SC2 is contained, in step SC3 the control server control unit 40 acquires and includes the tax name information J23 contained in the transaction information in the record. If not contained, the control server control unit 40 writes a null value to the tax name information J23 field in the record.

As shown in FIG. 5, each record in the transaction information manager database 421 contains tax information J7.

If tax information J7 is included in the transaction information extracted in step SC2

If the tax information J7 is included in the transaction information extracted in step SC2, in step SC3 the control server control unit 40 acquires and stores the tax information J7 contained in the transaction information in the record. If not contained, the control server control unit 40 writes a null value to the tax information J7 field in the record.

As shown in FIG. 5, each record in the transaction information manager database 421 contains name-of-discount information.

The name-of-discount information J24 is information identifying the name of the applied discount when a specific discount is applied to the transaction. A specific discount may be applied to a transaction. In this event, information identifying the name of the applied discount is printed on the receipt.

If the name-of-discount information J24 is included in the transaction information extracted in step SC2, in step SC3 the control server control unit 40 acquires and stores the name-of-discount information J24 contained in the transaction information in the record. If not contained, the control server control unit 40 writes a null value to the name-of-discount information J24 field in the record.

As shown in FIG. 5, each record in the transaction information manager database 421 stores discounted amount information J25.

The discounted amount information J25 is information identifying the amount of the discount when a specific discount is applied to a transaction.

If the discounted amount information J25 is included in the transaction information extracted in step SC2, in step SC3 the control server control unit 40 acquires and stores the discounted amount information J25 contained in the transaction information in the record. If not contained, the control server control unit 40 writes a null value to the discounted amount information J25 field in the record.

As shown in FIG. 5, each record in the transaction information manager database 421 stores name of payment method information J26.

In addition to payment by cash, the method of payment used by the customer in a transaction may be payment by credit card, payment by check, payment by points, or other methods other than payment by cash. The name of payment method information J26 is information identifying the name of the payment method used by the customer. The name of payment method information J26 may also be printed on the receipt.

If the name of payment method information J26 is included in the transaction information extracted in step SC2, in step SC3 the control server control unit 40 acquires and stores the name of payment method information J26 contained in the transaction information in the record. If not contained, the control server control unit 40 writes a null value to the name of payment method information J26 field in the record.

As shown in FIG. 5, each record in the transaction information manager database 421 contains payment amount information J27.

The payment amount information J27 is information identifying the amount paid by the customer using the payment method of the name identified by the name of payment method information J26.

If the payment amount information J27 is included in the transaction information extracted in step SC2, in step SC3 the control server control unit 40 acquires and stores the payment amount information J27 contained in the transaction information in the record. If not contained, the control server control unit 40 writes a null value to the payment amount information J27 field in the record.

As shown in FIG. 5, each record in the transaction information manager database 421 stores product information J28.

The product information J28 includes purchased product information J281, and cancelled product information J282 in specific cases.

The purchased product information J281 is information related to the products purchased by the customer. One or more records of purchased product information J281 may be stored in the product information J28 for each of the products purchased by the customer.

As shown in FIG. 5, the purchased product information J281 includes product name information J52, purchased quantity information J51, and unit price information J53.

If product name information J52, purchased quantity information J51, or unit price information J53 is included in the transaction information extracted in step SC2, in step SC3 the control server control unit 40 acquires and stores the product name information J52, purchased quantity information J51, or unit price information J53 in the record. The control server control unit 40 writes a null value for any of the product name information J52, purchased quantity information J51, or unit price information J53 that is not included in the transaction information extracted in step SC2.

As shown in FIG. 5, the purchased product information J281 contains name-of-discount for purchased product information J2811.

The name-of-discount for purchased product information J2811 is information identifying the name of the discount that was applied when a specific discount is applied to a purchased product. If a specific discount is applied to one product purchased by the customer, information identifying the name of the applied discount is printed relationally to the information related to that one product on the receipt.

If the name-of-discount for purchased product information J2811 is included in the transaction information extracted in step SC2, in step SC3 the control server control unit 40 acquires and stores the name-of-discount for purchased product information J2811 included in the transaction information in the record. If not included, the control server control unit 40 writes a null value to the name-of-discount for purchased product information J2811 field in the record.

As shown in FIG. 5, purchased product information J281 includes purchased product discounted amount information J2812.

The purchased product discounted amount information J2812 is information identifying the amount of the discount when a specific discount is applied to a purchased product. If a specific discount is applied to one product purchased by the customer, information identifying the discounted amount applied by the discount is printed relationally to the information related to that one product on the receipt.

If the purchased product discounted amount information J2812 is included in the transaction information extracted in step SC2, in step SC3 the control server control unit 40 acquires and stores the purchased product discounted amount information J2812 contained in the transaction information in the record. If not contained, the control server control unit 40 writes a null value to the purchased product discounted amount information J2812 field in the record.

The cancelled product information J282 is information related to the product of which the purchase was cancelled by the customer in the transaction. Cancelling a customer purchase of a product may be done in response to a customer instruction or, for example, to correct a processing error by the checkout clerk.

When the purchase of a product is cancelled in a transaction, an entry of cancelled product information J282 may be included in the product information J28 for each of the products for which the purchase was cancelled.

As shown in FIG. 5, the cancelled product information J282 includes cancelled product name information J2821, cancelled product quantity information J2822, cancelled product unit price information J2823, cancelled product name-of-discount information J2824, and cancelled product discounted amount information J2825.

The cancelled product name information J2821 is information identifying the name of the product for which the purchase was cancelled.

The cancelled product quantity information J2822 information identifying the quantity of the product for which the purchase was cancelled.

The cancelled product unit price information J2823 is information identifying the name of the discount that was applied if a discount was applied to the product for which the purchase was cancelled.

The cancelled product discounted amount information J2825 is information identifying the amount that was discounted by the applied discount if a discount was applied to the product for which the purchase was cancelled.

If cancelled product name information J2821, cancelled product quantity information J2822, cancelled product unit price information J2823, cancelled product name-of-discount information J2824, or cancelled product discounted amount information J2825 is included in the transaction information, in step SC3 the control server control unit 40 acquires and stores the cancelled product quantity information J2822, cancelled product unit price information J2823, cancelled product name-of-discount information J2824, or cancelled product discounted amount information J2825 that was included in the transaction information in the record. The control server control unit 40 stores a null value for any of the cancelled product name information J2821, cancelled product quantity information J2822, cancelled product unit price information J2823, cancelled product name-of-discount information J2824, or cancelled product discounted amount information J2825 that is not included in the transaction information extracted in step SC2.

The information stored in each record in the transaction information manager database 421 is described above, but the described information is for example only, and other information may also be stored in the records.

The values of the information stored in each record in the transaction information manager database 421 can also be changed by an authorized person using a specific method.

Note that the subtotal information J6 and transaction total information J8 are examples of amount information related to a transaction payment.

In addition, the name-of-discount information J24 and discounted amount information J25 are examples of discount information related to a transaction discount.

In addition, the tax information J7 and tax name information J23 are examples of tax information related to taxes in a transaction.

In addition, the information contained in each record in the transaction information manager database 421 is an example of transaction information.

As described above, the transaction information manager database 421 stores records of transaction information for each transaction that is performed in any store where the store system 11 is deployed.

In addition to the transaction information manager database 421, the control server 15 also stores a printer database 422.

The printer database 422 is a database that manages the printers 12 in each store system 11, tracks in which store a printer 12 is used.

Figure 6:
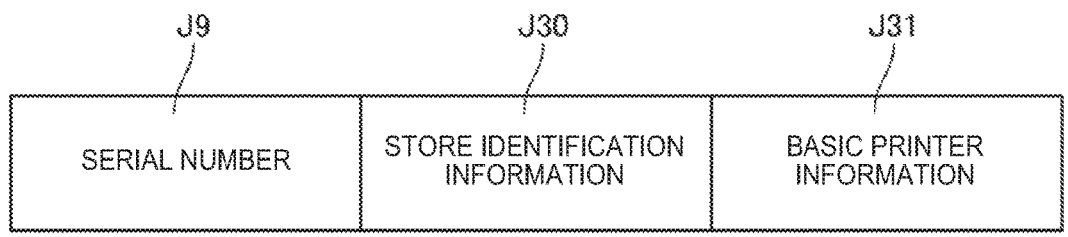
FIG. 6 illustrates a printer database.

FIG. 6 illustrates schematically illustrates the information contained in a record in the printer database 422.

The printer database 422 stores a record for each printer 12 in each store system 11.

As shown in FIG. 6, each record in the printer database 422 stores the serial number J9 of the printer 12, store identification information J30 for the store where the printer 12 is located, and basic printer information about the printer 12.

The store identification information J30 is identification information identifying a specific store.

The basic printer information J31 is basic information about the printer 12, such as the lane number of the checkout counter L where the printer 12 is installed in the store, the model number of the printer 12, and the version of firmware installed in the printer 12.

Processing by the control server 15 based on the transaction information manager database 421 is described next.

As described below, multiple Web APIs (Application Programming Interface) (API) are installed on the control server 15. The control server 15 can provide information required by the user by running a process of an installed Web API based on the transaction information manager database 421 in response to access from the management device 17.

The process of the control server 15 when providing information based on the transaction information manager database 421 is described below.

In this example, the user may want to get batch identification information J10 for more than one receipt, such as a receipt issued by a specific store, a receipt issued on a specific date by a specific store, a receipt produced by a specific printer 12, and a receipt produced on a specific date by a specific printer 12. This is because if batch identification information J10 for the receipts can be acquired, detailed information about the transaction related to each receipt can be acquired by the means described below.

In this example, when accessed from the management device 17, the control server 15 provides batch identification information J10 for the receipts produced under the specific conditions specified by the user by the method described below.

Note that an example in which the management device 17 accesses the control server 15 is described below, but devices that can access the control server 15 are not limited to the management device 17. A device that can access the control server 15 may be any device on which a browser is installed and is used by someone with specific authority.

Figure 7:
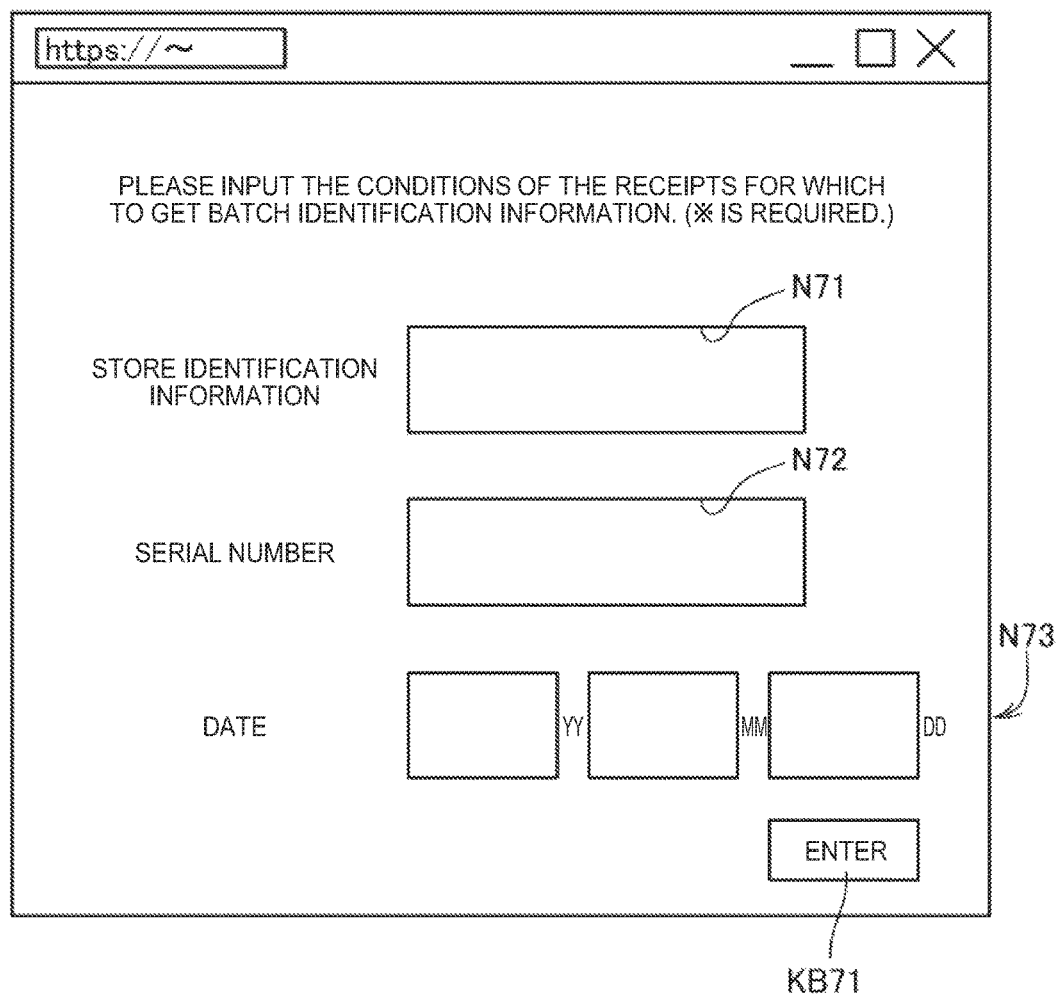
FIG. 7 shows an input screen for receipt printing conditions.

A user wanting to acquire batch identification information J10 for receipts produced under specific conditions starts the browser on the management device 17, and instructs accessing a specific URL on the control server 15 related to displaying a receipt conditions input screen G71 (FIG. 7). The user is previously informed of the URL by a specific method.

The browser execution unit 601 of the management device control unit 60 of the management device 17 accesses the specific URL on the control server 15 in response to the user command. In response to the specific URL being accessed, the control server control unit 40 of the control server 15 sends an HTML file for displaying the receipt conditions input screen G71 (FIG. 7) to the management device 17.

The browser execution unit 601 of the management device 17 then presents the receipt conditions input screen G71 based on the received HTML file on the management device display unit 63.

Note that while not described in detail below, when the control server 15 is accessed from the management device 17, authentication determining if the user is a person with the specific authority is performed appropriately by a specific method.

FIG. 7 shows an example of the receipt conditions input screen G71.

As shown in FIG. 7, receipt conditions input screen G71 has a store identification information input field N71. The store identification information input field N71 is an input box for inputting store identification information J30. Inputting the store identification information J30 to the store identification information input field N71 is required. The user inputs the store identification information J30 of the store that produced the receipt for which batch identification information J10 is to be retrieved to the store identification information input field N71.

As shown in FIG. 7, the receipt conditions input screen G71 also has a serial number input field N72. The serial number input field N72 is an input box for inputting the serial number J9. To acquire batch identification information J10 related to a receipt produced by a specific printer 12, the user inputs the serial number of the specific printer 12 to the serial number input field N72.

As shown in FIG. 7, the receipt conditions input screen G71 also has a receipt date input field N73. The receipt date input field N73 has input boxes for inputting information identifying a specific date (year, month, day). To acquire batch identification information J10 related to a receipt produced on a specific date, the user inputs information identifying the specific date to the receipt date input field N73.

Note that the information indicating the date specified by the user by input to the receipt date input field N73 is referred to below as the "specified receipt date information," and is identified by reference numeral J32.

As shown in FIG. 7, the receipt conditions input screen G71 also has an Enter button KB71. The Enter button KB71 is a button for confirming the input to the receipt conditions input screen G71.

The user may input to the receipt conditions input screen G71 as described below, for example.

For example, to acquire batch identification information J10 for receipts produced on a specific date in a specific store, the user inputs the store identification information J30 of the specific store to the store identification information input field N71, and inputs the information J32 identifying the specific date to the receipt date input field N73.

In another example, to acquire batch identification information J10 for receipts produced by a specific printer 12 on a specific date, the user inputs the serial number J9 of the specific printer 12 to the serial number input field N72, and inputs the information J32 identifying the specific date to the receipt date input field N73.

When operation of the Enter button KB71 on the receipt conditions input screen G71 is detected, the browser execution unit 601 of the management device 17 gets the information input to the various input fields in the receipt conditions input screen G71.

Next, the browser execution unit 601 generates an HTTP request using the Receipts Web API, which is one of the Web APIs installed on the control server 15, and sends the generated HTTP request to the control server 15. The browser execution unit 601 generates and sends the HTTP request by a function of a script embedded in the HTML file related to the receipt conditions input screen G71, for example.

The Receipts Web API and HTTP request using the Receipts Web API are described below in detail.

Note that an HTTP request is an example of response request information requesting a response and including API call information specifying an API.

The GET method is used on the request line of an HTTP request in the Receipts Web API.

The specific URL on the control server 15 is recorded as the pathname, and information specifying the Receipts Web API is recorded according to a rule, on the request line of the HTTP request. Information that is passed as a parameter to the Receipts Web API is also recorded in the pathname according to a specific rule by a query parameter.

FIG. 8 is used to describe query parameters in the Receipts Web API.

FIG. 9(A) shows an example of a request line of an HTTP request in the Receipts Web API, and FIG. 9(B) shows another example. Note that {BASE_URL} in this example is a specific URL on the control server 15.

As shown in FIG. 8, six query parameters are available as Receipts Web API query parameters.

Of the Receipts Web API query parameters, the query parameter "shop_id" is the query parameter corresponding to the store identification information J30. The browser execution unit 601 records the shop_id query parameter based on the store identification information J30 input to the store identification information input field N71 (see (9A) and (9B) in FIG. 9).

Of the Receipts Web API query parameters, the query parameter "serial_no" is the query parameter corresponding to the serial number J9. The browser execution unit 601 records the serial_no query parameter based on the serial number J9 input to the serial number input field N72.

Of the Receipts Web API query parameters, the query parameter "date" is the query parameter corresponding to the specified receipt date information J32 described above. The browser execution unit 601 records the date query parameter based on the specified receipt date information J32 input to the receipt date input field N73.

The control server control unit 40 of the control server 15 receives the HTTP request of the Receipts Web API that the management device 17 sent.

Next, the control server control unit 40 executes the following process based on the Receipts Web API specified by the received HTTP request, and the query parameters recorded on the request line. More specifically, the control server control unit 40 collects the information corresponding to the HTTP request from the transaction information manager database 421 by a function of the Receipts Web API, generates data ("response data" below) describing the retrieved information in JSON (JavaScript® Object Notation) format, and returns the generated response data in an HTTP response.

Note that the HTTP response and the response data contained in the HTTP response are examples of information indicating the process result.

FIG. 10 is used to describe properties of response data in the Receipts Web API.

As shown in FIG. 10, there are nine properties available as properties of response data in the Receipts Web API.

Of the properties of response data in the Receipts Web API, the "items" property is the property containing the batch identification information J10 of issued receipts that match the conditions specified by the user.

To populate the items property, the control server control unit 40 retrieves the batch identification information J10 for the issued receipts that match the conditions specified by the user through a function of the Receipts Web API.

More specifically, the control server control unit 40 references the printer database 422, and retrieves the serial number J9 of each printer 12 in the store identified by the store identification information J30 specified by the user.

Next, the control server control unit 40 references the transaction information manager database 421 and finds the records matching the conditions specified by the user.

For example, if the user specified store identification information J30, the control server control unit 40 finds each record containing the same serial number J9 as the serial number J9 of each printer 12 in the store identified by the store identification information J30 specified by the user.

Further alternatively, when the user specifies a serial number J9 and receipt date information J32, the control server control unit 40 finds each record that stores the same serial number J9 as the serial number J9 specified by the user, and also stores receipt date information J4 specifying a date/time value belonging to the date identified by the specified receipt date information J32 the user specified.

Next, the control server control unit 40 acquires the batch identification information J10 from each of the retrieved records.

FIG. 11 shows an example of response data corresponding to the HTTP request related to the sample request line shown in (9A) in FIG. 9.

FIG. 12 shows an example of response data corresponding to the HTTP request related to the sample request line shown in (9B) in FIG. 9.

As shown in FIG. 11 and FIG. 12, the control server control unit 40 generates JSON-format response data reflecting the information added as query parameters by a function of the Receipts Web API.

As described above, the control server control unit 40 generates response data responding to the HTTP request, and returns the generated response data as an HTTP response.

The browser execution unit 601 of the management device 17 then receives the HTTP response.

Next, based on the response data in the received HTTP response, the browser execution unit 601 displays a list window G131 (FIG. 13) presenting the batch identification information J10 of each receipt that was issued under the conditions specified by the user.

Figure 13:
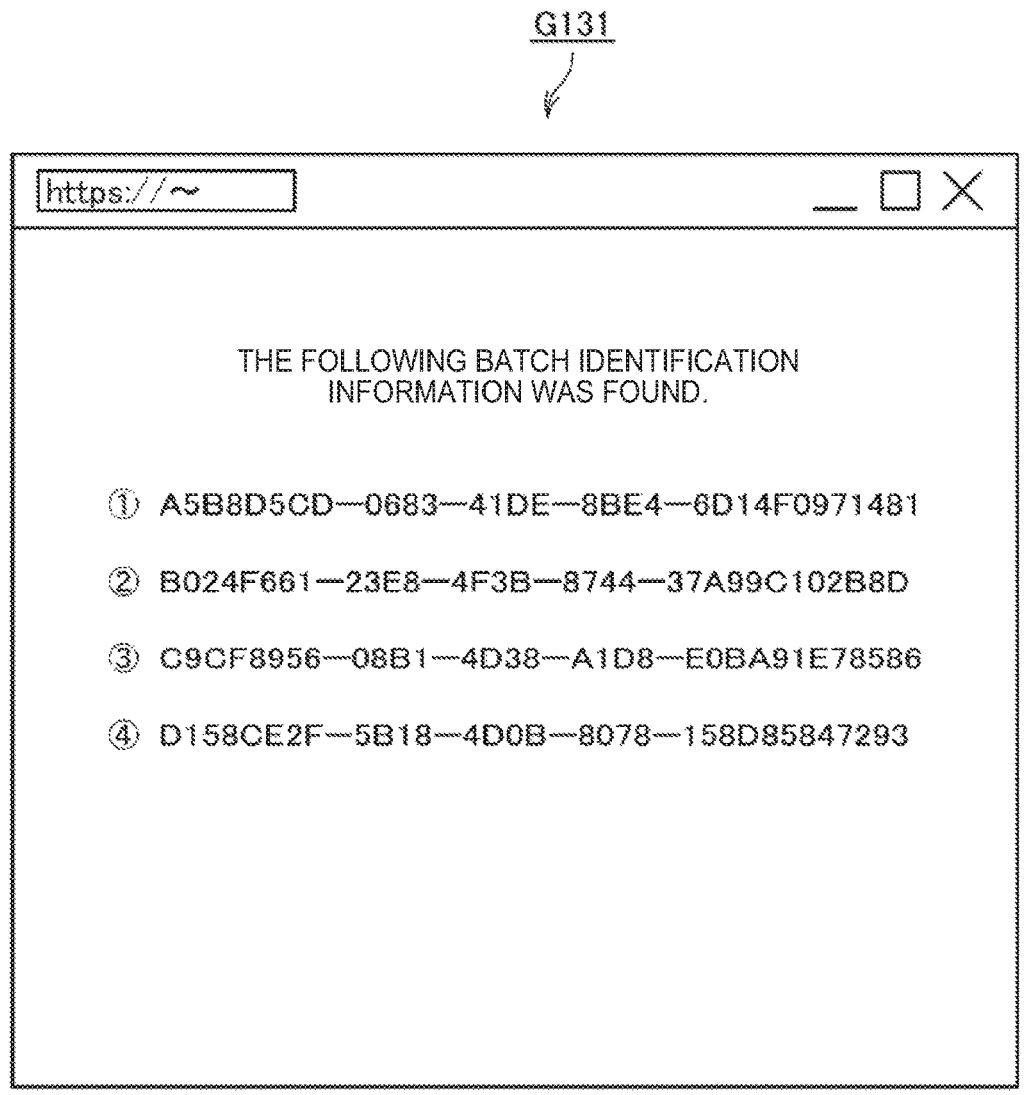
FIG. 13 shows a list window.

FIG. 13 shows an example of the list window G131 displayed based on the response data example shown in FIG. 11.

As shown in FIG. 13, a list of batch identification information J10 for the receipts matching the conditions specified by the user based on the items property is displayed in the list window G131.

By reading the list window G131, the user can easily and appropriately know and acquire the batch identification information J10 for the receipts matching the specified conditions.

Next, the user may want to retrieve for a particular receipt detailed information about the transaction related to the receipt. By the method described below, the control server 15 provides information related to the transaction associated with the receipt specified by the user in response to access from the management device 17.

Figure 14:
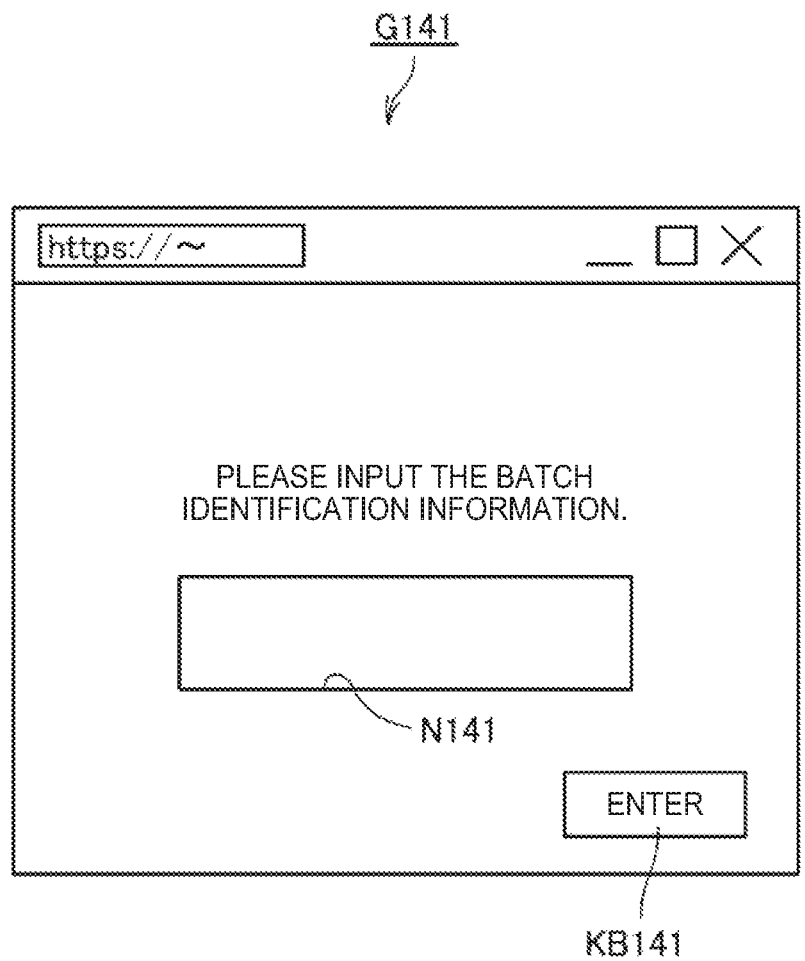
FIG. 14 shows a batch identification information input screen.

A user wanting to acquire detailed information related to the transaction associated with a specific receipt starts the browser on the management device 17, and instructs accessing a specific URL on the control server 15 related to displaying a batch identification information input screen G141 (FIG. 14). The user is previously informed of the URL by a specific method.

The browser execution unit 601 of the management device control unit 60 of the management device 17 accesses the specific URL on the control server 15 in response to the user command. In response to the specific URL being accessed, the control server control unit 40 of the control server 15 sends an HTML file for displaying the batch identification information input screen G141 (FIG. 14) to the management device 17.

The browser execution unit 601 of the management device 17 then presents the batch identification information input screen G141 (FIG. 14) based on the received HTML file on the management device display unit 63.

FIG. 14 shows an example of the batch identification information input screen G141.

As shown in FIG. 14, the batch identification information input screen G141 has a batch identification information input field N141. The batch identification information input field N141 is an input field for inputting batch identification information J10. The user inputs the batch identification information J10 of the receipt for which detailed information related to the transaction is desired to the batch identification information input field N141.

As shown in FIG. 14, the batch identification information input screen G141 has an Enter button KB141. The Enter button KB141 is a button for confirming input to the batch identification information input screen G141.

When operation of the Enter button KB141 in the batch identification information input screen G141 is detected, the browser execution unit 601 of the management device 17 gets the batch identification information J10 that was input to the batch identification information input field N141.

Next, the browser execution unit 601 generates an HTTP request using the Receipts Web API, which is one of the Web APIs installed on the control server 15, and sends the generated HTTP request to the control server 15. The browser execution unit 601 generates and sends the HTTP request by a function of a script embedded in the HTML file related to the batch identification information input screen G141, for example.

The Receipts Web API and an HTTP request using the Receipts Web API are described below in detail.

The GET method is used on the request line of an HTTP request in the Receipts Web API.

The specific URL on the control server 15 is recorded as the pathname, and information specifying the Receipts Web API is recorded according to a rule, on the request line of the HTTP request. The batch identification information J10 that is passed to the Receipts Web API is also recorded in the pathname according to a specific rule by a query parameter.

FIG. 15 shows an example of a request line of an HTTP request in the Receipts Web API.

As shown in FIG. 15, the browser execution unit 601 adds the batch identification information J10 input to the batch identification information input field N141 of the batch identification information input screen G141 as a query parameter to the URL recorded in the request line.

Note that in the example shown in FIG. 15, the "receipts/A5B8D5CD-0683-41DE-8BE4-6D14F0971481" portion of the request line is an example of API call information specifying an API. If the string "receipts" is written as the argument identifying the API, and the batch identification information J10 is written in the query parameter, the control server control unit 40 of the control server 15 knows that the Receipts Web API was specified as the API to use for processing.

The control server control unit 40 of the control server 15 receives the HTTP request of the Receipts Web API that the management device 17 sent.

Next, the control server control unit 40 executes the following process based on the Receipts Web API specified by the received HTTP request, and the query parameters recorded on the request line. More specifically, the control server control unit 40 collects the information corresponding to the HTTP request from the transaction information manager database 421 by a function of the Receipts Web API, generates JSON format data describing the retrieved information, and returns the generated response data in an HTTP response.

FIG. 16 is used to describe properties related to response data in the Receipts Web API.

As shown in FIG. 16, multiple properties are available as response data properties in the Receipts Web API.

Of the response data properties in the Receipts Web API, the "guid" property is a property corresponding to the batch identification information J10.

Of the response data properties in the Receipts Web API, the "serial_no" property is a property corresponding to the serial number J9.

Of the response data properties in the Receipts Web API, the "shop_id" property is a property corresponding to the store identification information J30.

Of the response data properties in the Receipts Web API, the "printed_at" property is a property corresponding to the receipt date information J4.

Of the response data properties in the Receipts Web API, the "receipt_id" property is a property corresponding to the receipt identification information J3.

Of the response data properties in the Receipts Web API, the "is_refund" property is a property corresponding to the payment-returned information J11.

Of the response data properties in the Receipts Web API, the "total" property is a property corresponding to the transaction total information J8.

Of the response data properties in the Receipts Web API, the "subtotal" property is a property corresponding to the subtotal information J6.

Of the response data properties in the Receipts Web API, the "guests" property is a property corresponding to the customer count information J12.

Of the response data properties in the Receipts Web API, the "sale_type" property is a property corresponding to the sales method information J13.

Of the response data properties in the Receipts Web API, the "consumer_id" property is a property corresponding to the customer identification information J14.

Of the response data properties in the Receipts Web API, the "staff.id" property (a property associated with the staff property of type: object) is a property corresponding to the staff identification information J15.

Of the response data properties in the Receipts Web API, the "staff.has_original_id" property (a property associated with the staff property of type: object) is a property corresponding to the staff source information J16.

Of the response data properties in the Receipts Web API, the "memberships[ ].name" property (a property associated with the memberships property of Type:array) is a property corresponding to the membership program information J17.

Of the response data properties in the Receipts Web API, the "memberships[ ].account_no" property (a property associated with the memberships property of Type:array) is a property corresponding to the member identification information J18.

Of the response data properties in the Receipts Web API, the property "is_void" is a property corresponding to the cancellation information J19.

Of the response data properties in the Receipts Web API, the property "void.target" (a property associated with the void property of Type:object) is a property corresponding to the cancelled-transaction related information J20.

Of the response data properties in the Receipts Web API, the property "void.target.href" (a property associated with the void property of Type:object) is a property corresponding to the cancelled transaction link information J21.

Of the response data properties in the Receipts Web API, the property "void.type" (a property associated with the void property of Type:object) is a property corresponding to the reason-for-cancellation information J22.

Of the response data properties in the Receipts Web API, the property "taxes[ ].name" (a property associated with the taxes property of Type:array) is a property corresponding to the tax name information J23.

Of the response data properties in the Receipts Web API, the property "taxes[ ].value" (a property associated with the taxes property of Type:array) is a property corresponding to the tax information J7.

Of the response data properties in the Receipts Web API, the "products" property is an array property (Type:array). The products property is described below with reference to FIG. 17.

Of the response data properties in the Receipts Web API, the property "discounts[ ].name" (a property associated with the discounts property of Type:array) is a property corresponding to the name-of-discount information J24.

Of the response data properties in the Receipts Web API, the property "discounts[ ].value" (a property associated with the discounts property of Type:array) is a property corresponding to the discounted amount information J25.

Of the response data properties in the Receipts Web API, the property "payment_methods[ ].name" (a property associated with the payment_methods property of Type:array) is a property corresponding to the name of payment method information J26.

Of the response data properties in the Receipts Web API, the property "payment_methods[ ].value" (a property associated with the payment_methods property of Type:array) is a property corresponding to the payment amount information J27.

FIG. 17 is used to describe the properties associated with the puroducts property described above.

The property "name" is a property corresponding to the product name information J52.

The property "quantity" is a property corresponding to the purchased quantity information J51.

The property "price" is a property corresponding to the unit price information J53.

The property "discounts[ ].name" (a property associated with the discounts property of Type:array) is a property corresponding to the name-of-discount for purchased product information J2811.

The property "discounts[ ].value" (a property associated with the discounts property of Type:array) is a property corresponding to the purchased product discounted amount information J2812.

The property "modifiers[ ].name" (a property associated with the modifiers property of Type:array) is a property corresponding to the cancelled product name information J2821.

The property "modifiers[ ].quantity" (a property associated with the modifiers property of Type:array) is a property corresponding to the cancelled product quantity information J2822.

The property "modifiers[ ].price" (a property associated with the modifiers property of Type:array) is a property corresponding to the cancelled product unit price information J2823.

The property "modifiers[ ].discounts[ ].name" (a property associated with the modifiers property of Type:array, and the discounts property of Type:array) is a property corresponding to the cancelled product name-of-discount information J2824.

The property "modifiers[ ].discounts[ ].value" (a property associated with the modifiers property of Type:array, and the discounts property of Type:array) is a property corresponding to the cancelled product discounted amount information J2825.

To generate response data, the control server control unit 40 references the transaction information manager database 421 and retrieves the records having batch identification information J10 of the same value as the batch identification information J10 specified by the user.

Next, the control server control unit 40 acquires the information required to generate the response data from the retrieved records, and generates response data based on the acquired information.

Figure 18:
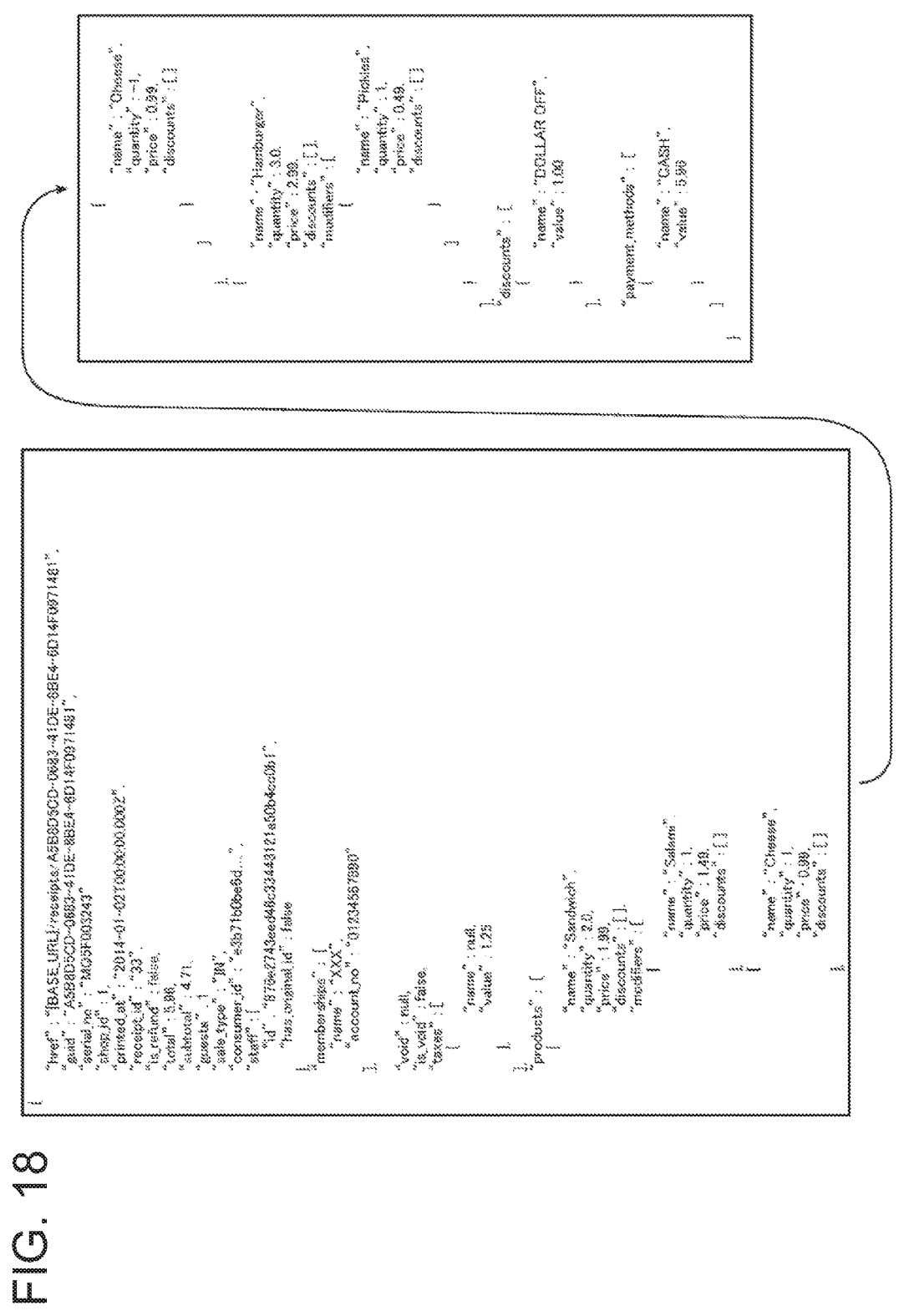

FIG. 18 shows an example of response data to the HTTP request on the sample request line shown in FIG. 15.

As shown in FIG. 18, the control server control unit 40 generates JSON format response data reflecting the information added as query parameters by a function of the Receipts Web API.

As described above, the control server control unit 40 generates response data to the HTTP request, and returns the generated response data as an HTTP response.

The browser execution unit 601 of the management device 17 then receives the HTTP response.

Next, the browser execution unit 601 displays a detailed list screen G191 (FIG. 19) containing at least part of the information in the response data based on the response data contained in the received HTTP response.

Figure 19:
FIG. 19 shows a detail display screen.

FIG. 19 shows an example of the detailed list screen G191 displayed based on the response data shown in FIG. 18.

As shown in FIG. 19, information related to the transaction associated with the receipt specified by the user is displayed in the detailed list screen G191 based on the response data.

By reading the detailed list screen G191, the user can easily and appropriately know and acquire information related to the transaction recorded on the specified receipt.

As described above, a control server 15 (information processing device) according to this embodiment of the invention can communicate with printers 12 for printing receipts containing transaction information related to a transaction, and has multiple APIs installed thereon. The control server 15 has a control server storage unit 42 that stores a transaction information manager database 421; and a control server control unit 40 that receives transaction information from a printer 12, stores the received transaction information in the transaction information manager database 421, and when response request information requesting a response and including API call information specifying an API (HTTP request) is received from a management device 17 (external device), executes a process by the API specified by the API call information, and sends information indicating the process result to the management device 17.

Thus comprised, an API having a function for executing a process based on the transaction information manager database is registered on the control server 15. Using the API, the management device 17 can cause the control server 15 to execute a process based on the transaction information manager database 421 and acquire the process result. As a result, transaction information printed on receipts can be easily utilized through the management device 17.

A printer 12 is installed in a business in this embodiment of the invention. The transaction information stored by the transaction information manager database 421 includes batch identification information J10 identifying the transaction corresponding to the transaction information. The Receipts Web API has a function for acquiring batch identification information J10 for a receipt produced by a printer 12 in the store identified by specific store identification information J30 based on the transaction information stored in the transaction information manager database 421. When response request information including API call information specifying the Receipts Web API and store identification information is received from the management device 17, the control server control unit 40 executes a process through the Receipts Web API, and acquires and transmits the batch identification information J10 related to receipts produced by a printer 12 installed in the store of the store identification information contained in the response request information as the information indicating the process result.

Thus comprised, batch identification information J10 related to a receipt issued by a specific store can be easily acquired through the management device 17 by using the Receipts Web API.

The transaction information in this embodiment of the invention also includes serial number J9 (printer identification information) and batch identification information J10. The Receipts Web API has a function for acquiring batch identification information J10 for a receipt produced by the printer 12 identified by a specific serial number J9. When response request information including API call information specifying the Receipts Web API and a serial number J9 is received from the management device 17, the control server control unit 40 executes a process through the Receipts Web API, and acquires and transmits batch identification information J10 related to receipts produced by the printer 12 of the serial number J9 contained in the response request information as the information indicating the process result.

Thus comprised, batch identification information J10 related to receipts produced by a specific printer 12 can be easily acquired through the management device 17 by using the Receipts Web API.

Transaction information in this embodiment of the invention also includes batch identification information J10 and purchased product information J281 related to the products purchased in the transaction. The Receipts Web API has a function for acquiring purchased product information J281 contained in transaction information related to specific batch identification information J10. When response request information including API call information specifying the Receipts Web API and batch identification information J10 is received from the management device 17, the control server control unit 40 executes a process through the Receipts Web API, and acquires and transmits the purchased product information J281 contained in the transaction information related to the batch identification information J10 contained in the response request information as the information indicating the process result.

Thus comprised, purchased product information J281 can be easily acquired through the management device 17 by using the Receipts Web API.

Transaction information in this embodiment of the invention also includes batch identification information J10 and amount information related to a transaction payment (such as subtotal information J6, transaction total information J8). The Receipts Web API has a function for acquiring amount information contained in transaction information related to specific batch identification information J10. When response request information including API call information specifying the Receipts Web API and batch identification information J10 is received from the management device 17, the control server control unit 40 executes a process through the Receipts Web API, and acquires and transmits the amount information contained in the transaction information related to the batch identification information J10 contained in the response request information as the information indicating the process result.

Thus comprised, amount information can be easily acquired through the management device 17 by using the Receipts Web API.

Transaction information in this embodiment of the invention also includes batch identification information J10 and discount information related to a transaction discount (such as name-of-discount information J24, discounted amount information J25). The Receipts Web API has a function for acquiring discount information contained in transaction information related to specific batch identification information J10. When response request information including API call information specifying the Receipts Web API and batch identification information J10 is received from the management device 17, the control server control unit 40 executes a process through the Receipts Web API, and acquires and transmits the discount information contained in the transaction information related to the batch identification information J10 contained in the response request information as the information indicating the process result.

Thus comprised, discount information can be easily acquired through the management device 17 by using the Receipts Web API.

Transaction information in this embodiment of the invention also includes batch identification information J10 and tax information related to taxes in a transaction (such as tax information J7 and tax name information J23). The Receipts Web API has a function for acquiring tax information contained in transaction information related to specific batch identification information J10. When response request information including API call information specifying the Receipts Web API and batch identification information J10 is received from the management device 17, the control server control unit 40 executes a process through the Receipts Web API, and acquires and transmits the tax information contained in the transaction information related to the batch identification information J10 contained in the response request information as the information indicating the process result.

Thus comprised, tax information can be easily acquired through the management device 17 by using the Receipts Web API.

The invention is described above with reference to a preferred embodiment thereof, but the invention is not limited thereto and can be modified and adapted in many ways without departing from the scope of the accompanying claims.

For example, when the control method of the control server 15 (control method of the information processing device) is implemented by a computer of the control server 15 or by an external device connected to the control server 15, the invention can be embodied by a program the computer executes to implement the method, by a recording medium recording the program readably by a computer, or a transmission medium that transfers the program. A magnetic or optical recording medium, or a semiconductor memory device, can be used as the recording medium. More specifically, a floppy disk, HDD (HardDisk Drive), CD-ROM (Compact Disk Read Only Memory), DVD (Digital Versatile Disk), Blu-ray® Disc, magneto-optical disc, flash memory, memory card media, or other type of removable or stationary recording medium. The recording medium may also be an internal storage device of the control server 15 or an external device connected to the control server 15, such as RAM (Random Access Memory), ROM (Read Only Memory), HDD, or other nonvolatile memory device.

In the embodiment described above, the printer 12 sends print data based on a transaction to the control server 15, and the control server 15 extracts transaction information from the print data. However, configurations in which the printer 12 extracts transaction information from the print data and sends the transaction information to the control server 15 are also conceivable.

Further alternatively, specific examples of the information stored in the transaction information manager database 421 and the printer database 422 are described in the foregoing embodiment, but the information stored in these databases is not limited to the foregoing examples.

The function blocks described above with reference to the figures can be embodied as desired by the cooperation of hardware and software, and do not suggest a specific hardware configuration.

REFERENCE SIGNS LIST 1 transaction processing system (information processing system)
12 printer
13 tablet terminal
15 the control server (information processing device)
17 management device
20 tablet terminal control unit
21 tablet terminal communication unit
22 touch panel
23 tablet terminal storage unit
30 printer control unit
31 print unit
32 printer storage unit
33 printer communication unit
34 printer network communication unit
35 device communication unit
40 the control server control unit (control unit)
41 the control server network communication unit
42 the control server storage unit (storage unit)
60 management device control unit
61 management device network communication unit
62 management device storage unit
63 management device display unit
201 tablet terminal application execution unit
421 transaction information manager database
422 printer database
601 browser execution unit
BR barcode reader
CD customer display
JT automatic change machine

The invention claimed is:

1. An information processing device capable of communicating with a printer that produces receipts printed with transaction information related to a transaction, and has a plurality of application programming interfaces (APIs) registered thereon, the information processing device comprising:
a storage storing a database; and
a processor configured to
receive print data of the printed receipts from the printer that receives the print data from a host computer and produces the receipts based on the received print data, the print data including a control command in a command language of the printer,
extract, from the received print data, the transaction information that is predefined information without the control command, and store the extracted transaction information in the database, and
execute, when response request information requesting a response and including API call information specifying an API is received from an external device, a process through the API specified by the API call information based on the transaction information stored in the database, and send information indicating a process result to the external device.

2. The information processing device described in claim 1, wherein:
the printer is installed in a store;
the transaction information stored in the database includes batch identification information identifying the transaction corresponding to the transaction information;
a specific API among the APIs functions to acquire, based on the transaction information stored in the database, the batch identification information related to receipts produced by the printer installed in the store identified by specific store identification information amongst store identification information identifying the stores; and
when response request information including the API call information specifying the specific API and the store identification information is received from the external device, the processor is further configured to
execute a specific process through the specific API, and acquire and transmit the batch identification information related to the receipts produced by the printer installed in the store of the store identification information contained in the response request information as the information indicating the process result.

3. The information processing device described in claim 1, wherein:
the transaction information includes printer identification information identifying the printer, and batch identification information identifying the transaction corresponding to the transaction information;
a specific API among the APIs functions to acquire the batch identification information of receipts produced by the printer of the printer identification information; and
when response request information including the API call information specifying the specific API and the printer identification information is received from the external device, the processor is further configured to
execute a specific process through the specific API, and acquire and transmit the batch identification information related to the receipts produced by the printer of the printer identification information contained in the response request information as the information indicating the process result.

4. The information processing device described in claim 1, wherein:
the transaction information includes batch identification information identifying the transaction corresponding to the transaction information, and purchased product information related to a product purchased in the transaction;
a specific API among the APIs functions to acquire the purchased product information contained in the transaction information related to the batch identification information; and
when response request information including the API call information specifying the specific API and the batch identification information is received from the external device, the processor is further configured to
execute a specific process through the specific API, and acquire and transmit the purchased product information contained in the transaction information related to the batch identification information contained in the response request information as the information indicating the process result.

5. The information processing device described in claim 1, wherein:
the transaction information includes batch identification information identifying the transaction corresponding to the transaction information, and amount information related to payment in the transaction;
a specific API among the APIs functions to acquire the amount information contained in the transaction information related to the batch identification information; and
when response request information including the API call information specifying the specific API and the batch identification information is received from the external device,
the processor is further configured to
execute a specific process through the specific API, and acquire and transmit the amount information contained in the transaction information related to the batch identification information contained in the response request information as the information indicating the process result.

6. The information processing device described in claim 1, wherein:
the transaction information includes batch identification information identifying the transaction corresponding to the transaction information, and discount information related to a discount in the transaction;
a specific API among the APIs functions to acquire the discount information contained in the transaction information related to the batch identification information; and
when response request information including the API call information specifying the specific API and the batch identification information is received from the external device,
the processor is further configured to
execute a specific process through the specific API, and acquire and transmit the discount information contained in the transaction information related to the batch identification information contained in the response request information as the information indicating the process result.

7. The information processing device described in claim 1, wherein:
the transaction information includes batch identification information identifying the transaction corresponding to the transaction information, and tax information related to taxes in the transaction;
a specific API among; the APIs functions to acquire the tax information contained in the transaction information related to the batch identification information; and
when response request information including the API call information specifying the specific API and the batch identification information is received from the external device,
the processor is further configured to
execute a specific process through the specific API, and acquire and transmit the tax information contained in the transaction information related to the batch identification information contained in the response request information as the information indicating the process result.

8. An information processing system comprising:
an information processing device having a plurality of application programming interfaces (APIs) registered thereon and capable of communicating with a printer that produces receipts printed with transaction information related to a transaction; and
an external device capable of communicating with the information processing device,
wherein the external device is configured to transmit response request information requesting a response and including an API call information specifying the API to the information processing device,
wherein the information processing device is configured to
receive print data of the printed receipts from the printer that receives the print data from a host computer and produces the receipts based on the received print data, the print data including a control command in a command language of the printer, and
extract, from the received print data, the transaction information that is predefined information without the control command, and store the extracted transaction information in a database, and
wherein the information processing device includes processor that is configured to:
execute, when the response request information is received from the external device, a process through the API specified by the API call information based on the transaction information stored in the database, and
send information indicating a process result to the external device.

9. A control method of an information processing device capable of communicating with a printer that produces receipts printed with transaction information related to a transaction, and having a plurality of application programming interfaces (APIs) registered thereon, the control method comprising:
receiving print data of the printed receipts from the printer that receives the print data from a host computer and produces the receipts based on the received print data, the print data including a control command in a command language of the printer;
extracting, from the received print data, the transaction information that is predefined information without the control command, and storing the extracted transaction information in a database; and when response request information requesting a response and including API call information specifying an API is received from an external device, executing a process through the API specified by the API call information based on the transaction information stored in the database, and sending information indicating a process result to the external device.

* * * * *